(12) United States Patent
Altberg et al.

(10) Patent No.: US 8,934,614 B2
(45) Date of Patent: Jan. 13, 2015

(54) SYSTEMS AND METHODS FOR DYNAMIC PAY FOR PERFORMANCE ADVERTISEMENTS

(75) Inventors: Ebbe Altberg, Mill Valley, CA (US); Scott Faber, San Francisco, CA (US); Ron Hirson, San Francisco, CA (US); Sean Van Der Linden, Berkeley, CA (US); Paul G. Manca, Oakland, CA (US)

(73) Assignee: YP Interatcive LLC, Wilmington, DE (US)

( * ) Notice: Subject to any disclaimer, the term of this patent is extended or adjusted under 35 U.S.C. 154(b) by 1386 days.

(21) Appl. No.: 12/127,585

(22) Filed: May 27, 2008

(65) Prior Publication Data

US 2009/0016507 A1 Jan. 15, 2009

Related U.S. Application Data

(60) Provisional application No. 60/949,800, filed on Jul. 13, 2007.

(51) Int. Cl.
*H04M 15/00* (2006.01)
*H04M 17/00* (2006.01)
*G06Q 30/02* (2012.01)
*H04M 3/42* (2006.01)
(Continued)

(52) U.S. Cl.
CPC ............... *H04M 17/00* (2013.01); *G06Q 30/02* (2013.01); *H04M 3/42195* (2013.01); *H04M 3/4878* (2013.01); *H04M 7/003* (2013.01)
USPC ................ 379/114.13; 379/88.13; 705/14.49; 705/14.69; 705/37

(58) Field of Classification Search
USPC ............... 379/114.01, 114.13, 88.13, 113.05, 379/114.1, 114.12; 705/14.69, 37, 705/14.4–14.42, 14.5, 14.49, 14.51, 14.62, 705/14.67–14.73
See application file for complete search history.

(56) References Cited

U.S. PATENT DOCUMENTS

| 4,604,686 A | 8/1986 | Reiter et al. |
| 4,677,659 A | 6/1987 | Dargan |

(Continued)

FOREIGN PATENT DOCUMENTS

| KR | 20010086595 | 9/2001 |
| WO | 2005040962 | 5/2005 |

(Continued)

OTHER PUBLICATIONS

Business Wire, "GoTo.com Teams With Netscape as Premier Search Provider for Popular Netscape Net Search Program," Jul. 1, 1999, p. 1356. Available at: http://www.thefreelibrary.com/_/print/PrintArticle.aspx?id=55045194.

(Continued)

*Primary Examiner* — Md S Elahee
(74) *Attorney, Agent, or Firm* — Kilpatrick Townsend & Stockton LLP

(57) ABSTRACT

Methods and apparatuses to dynamically determine the performance event of a listing based on the progress levels of responses received in response to a presentation of the listing. One embodiment includes: providing a listing on behalf of an entity for presentation to a user; identifying an event from a set of predetermined events based on communications made by the user responsive to a presentation of the listing; and charging the entity a fee per the event identifying from the set of predetermined events.

15 Claims, 16 Drawing Sheets

(51) Int. Cl.
H04M 3/487 (2006.01)
H04M 7/00 (2006.01)

(56) References Cited

U.S. PATENT DOCUMENTS

| | | |
|---|---|---|
| 4,757,267 A | 7/1988 | Riskin |
| 4,788,718 A | 11/1988 | McNabb et al. |
| 4,817,129 A | 3/1989 | Riskin |
| 4,847,890 A | 7/1989 | Solomon et al. |
| 5,319,542 A | 6/1994 | King, Jr. et al. |
| 5,339,358 A | 8/1994 | Danish et al. |
| 5,359,508 A | 10/1994 | Rossides |
| 5,469,497 A | 11/1995 | Pierce et al. |
| 5,574,780 A | 11/1996 | Andruska et al. |
| 5,596,634 A | 1/1997 | Fernandez et al. |
| 5,602,905 A | 2/1997 | Mettke |
| 5,615,213 A | 3/1997 | Griefer |
| 5,659,742 A | 8/1997 | Beattie et al. |
| 5,694,549 A | 12/1997 | Carlin et al. |
| 5,781,894 A | 7/1998 | Petrecca et al. |
| 5,794,210 A | 8/1998 | Goldhaber et al. |
| 5,802,502 A | 9/1998 | Gell et al. |
| 5,819,092 A | 10/1998 | Ferguson et al. |
| 5,862,223 A | 1/1999 | Walker et al. |
| 5,884,032 A | 3/1999 | Bateman et al. |
| 5,901,214 A | 5/1999 | Shaffer et al. |
| 5,914,951 A | 6/1999 | Bentley et al. |
| 5,940,471 A | 8/1999 | Homayoun |
| 5,943,416 A | 8/1999 | Gisby |
| 5,960,416 A | 9/1999 | Block |
| 5,982,863 A | 11/1999 | Smiley et al. |
| 5,987,118 A | 11/1999 | Dickerman et al. |
| 5,999,611 A | 12/1999 | Tatchell et al. |
| 6,028,601 A | 2/2000 | Machiraju et al. |
| 6,055,513 A | 4/2000 | Katz et al. |
| 6,108,493 A | 8/2000 | Miller et al. |
| 6,167,449 A | 12/2000 | Arnold et al. |
| 6,173,279 B1 | 1/2001 | Levin et al. |
| 6,188,761 B1 | 2/2001 | Dickerman et al. |
| 6,269,336 B1 | 7/2001 | Ladd et al. |
| 6,292,799 B1 | 9/2001 | Peek et al. |
| 6,314,402 B1 | 11/2001 | Monaco et al. |
| 6,323,894 B1 | 11/2001 | Katz |
| 6,381,325 B1 | 4/2002 | Hanson |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,430,276 B1 | 8/2002 | Bouvier et al. |
| 6,434,527 B1 | 8/2002 | Horvitz |
| 6,442,529 B1 | 8/2002 | Krishan et al. |
| 6,461,162 B1 | 10/2002 | Reitman et al. |
| 6,470,317 B1 | 10/2002 | Ladd et al. |
| 6,493,671 B1 | 12/2002 | Ladd et al. |
| 6,493,673 B1 | 12/2002 | Ladd et al. |
| 6,504,920 B1 | 1/2003 | Okon et al. |
| 6,513,013 B1 | 1/2003 | Stephanou |
| 6,539,359 B1 | 3/2003 | Ladd et al. |
| 6,625,595 B1 | 9/2003 | Anderson et al. |
| 6,636,590 B1 | 10/2003 | Jacob et al. |
| 6,658,389 B1 | 12/2003 | Alpdemir |
| 6,691,093 B2 | 2/2004 | Shell |
| 6,704,403 B2 | 3/2004 | Lurie et al. |
| 6,732,183 B1 | 5/2004 | Graham |
| 6,735,588 B2 | 5/2004 | Kim et al. |
| 6,757,364 B2 | 6/2004 | Newkirk |
| 6,836,225 B2 | 12/2004 | Lee et al. |
| 6,839,737 B1 | 1/2005 | Friskel |
| 6,910,035 B2 | 6/2005 | Hoekman et al. |
| 7,013,280 B2 | 3/2006 | Davis et al. |
| 7,035,468 B2 | 4/2006 | Yogeshwar et al. |
| 7,092,091 B2 | 8/2006 | Itoh et al. |
| 7,369,996 B2 | 5/2008 | Sladden |
| 7,428,497 B2 | 9/2008 | Agarwal et al. |
| 7,475,149 B2 | 1/2009 | Jacob et al. |
| 7,505,920 B2 | 3/2009 | Agarwal et al. |
| 7,555,110 B2 | 6/2009 | Dolan et al. |
| 7,668,950 B2 | 2/2010 | Horowitz et al. |
| 7,792,257 B1 * | 9/2010 | Vanier et al. ............. 379/114.13 |
| 7,876,886 B2 | 1/2011 | Altberg et al. |
| 7,995,723 B2 | 8/2011 | Jacob et al. |
| 8,027,878 B2 | 9/2011 | Wong et al. |
| 8,140,389 B2 | 3/2012 | Altberg et al. |
| 8,140,392 B2 | 3/2012 | Altberg et al. |
| 8,209,225 B2 | 6/2012 | Altberg et al. |
| 8,280,018 B2 | 10/2012 | Altberg et al. |
| 8,468,050 B2 | 6/2013 | Faber et al. |
| 8,521,596 B2 | 8/2013 | Altberg et al. |
| 8,687,783 B2 | 4/2014 | Altberg et al. |
| 2001/0029482 A1 | 10/2001 | Tealdi et al. |
| 2002/0062393 A1 | 5/2002 | Borger et al. |
| 2002/0069105 A1 | 6/2002 | do Rosario Botelho |
| 2002/0103746 A1 * | 8/2002 | Moffett, Jr. ............. 705/37 |
| 2002/0116256 A1 | 8/2002 | De Rafael et al. |
| 2002/0116266 A1 | 8/2002 | Marshall |
| 2002/0120554 A1 | 8/2002 | Vega |
| 2002/0133402 A1 | 9/2002 | Faber et al. |
| 2002/0191762 A1 | 12/2002 | Benson |
| 2003/0046198 A1 | 3/2003 | Knapp et al. |
| 2003/0086556 A1 | 5/2003 | Welch, III et al. |
| 2003/0191693 A1 | 10/2003 | Aphek |
| 2003/0212759 A1 | 11/2003 | Wu |
| 2003/0220866 A1 * | 11/2003 | Pisaris-Henderson et al. . 705/37 |
| 2004/0103024 A1 | 5/2004 | Patel et al. |
| 2004/0193740 A1 | 9/2004 | Kasmirsky et al. |
| 2004/0196833 A1 | 10/2004 | Dahan et al. |
| 2004/0199494 A1 | 10/2004 | Bhatt |
| 2005/0074102 A1 | 4/2005 | Altberg et al. |
| 2005/0216345 A1 | 9/2005 | Altberg et al. |
| 2005/0256769 A1 | 11/2005 | Rossides |
| 2006/0277108 A1 * | 12/2006 | Altberg et al. ............. 705/14 |
| 2007/0070980 A1 | 3/2007 | Phelps et al. |
| 2007/0100799 A1 | 5/2007 | Rose et al. |
| 2007/0168354 A1 | 7/2007 | Ramer et al. |
| 2008/0004954 A1 * | 1/2008 | Horvitz ............. 705/14 |
| 2008/0187114 A1 | 8/2008 | Altberg et al. |
| 2008/0242279 A1 | 10/2008 | Ramer et al. |
| 2009/0067599 A1 | 3/2009 | Agarwal et al. |
| 2010/0082431 A1 | 4/2010 | Ramer et al. |
| 2010/0287202 A1 | 11/2010 | Inoue et al. |
| 2011/0137754 A1 | 6/2011 | Fernandez |
| 2012/0179524 A1 | 7/2012 | Altberg et al. |
| 2013/0012158 A1 | 1/2013 | Altberg et al. |
| 2013/0044870 A1 | 2/2013 | Altberg et al. |
| 2013/0103503 A1 | 4/2013 | Zhang et al. |
| 2013/0311261 A1 | 11/2013 | Faber et al. |
| 2013/0325635 A1 | 12/2013 | Altberg et al. |

FOREIGN PATENT DOCUMENTS

| | | |
|---|---|---|
| WO | 2005101269 | 10/2005 |
| WO | 2005109287 | 11/2005 |
| WO | 2005109288 | 11/2005 |

OTHER PUBLICATIONS

"Keen.com raises $60 Million from Prestigious Investors and Strategic Partners Just 60 Days After Launch of Its Live Answer Community," Business Wire, Jan. 11, 2000.

"Sell and Buy Advice Online," The Ottawa Citizen, p. D7, Nov. 29, 1999.

CCBN, Inc. "Full Year 2003 and Q4 Ebookers PLC Earnings Conference Call—Part 2," Fair Disclosure Wire, Mar. 22, 2004.

Clark, Don, "Keen.com Plans Web Service Allowing Customers to Hold Private Phone Chats," Wall Street Journal, Nov. 8, 1999.

Ingenio, Inc., "Keen: Your Personal Advisor," retrieved from http://www.keen.com, available at least by Feb. 4, 2006.

(56) References Cited

OTHER PUBLICATIONS

International Application No. PCT/US05/12061, Written Opinion and International Search Report, Nov. 17, 2006.
International Application No. PCT/US01/48284, International Preliminary Examination Report, Aug. 9, 2002.
International Application No. PCT/US01/48284, International Search Report, May 13, 2002.
Rose, D.E. et al., "Understanding User Goals in Web Search," Proceedings of the 13th Int'l Conference on World Wide Web, pp. 13-19, May 17-20, 2004.

* cited by examiner

_— 141

Create Ad　　　　　　　　　　　　　　　　　　　　　　　　　　　　　　　　　　　[?] Help

Your ad is very important. Tell customers exactly what you're selling and why they should call you. Please review our Pay Per Call Ad Guidelines to ensure your ad is accepted and gets new customers calling your business today.

Ad Location Info

Business Name: [　　　　　　　] (Sorry, no phone numbers)

☐ Use my Account Information

Address 1: [　　　　　　　]

Address 2: [　　　　　　　] (Optional)

City: [　　　　　　　]

State: [-Select State- ▽]

Zip Code: [　　]–[　　]

Phone Number: ([　]) [　]–[　]　Enter the number where you'd like to receive calls

Fax: ([　]) [　]–[　]

Ad Marketing Message

Millions of people online will see your ad. So, in line 1 write a strong headline explaining what you're selling. To get people calling your business, include a promotional offer in line 2. This encourages buyers to call you now! Please note: Line 1 and Line 2 must each a complete sentence. Tips for success
Examples of Promotional Offers:
　- Call today and get $5 off.
　- Free consultation – limited time.
　- Call now and save 10%.
You'll be able to include more information about your offer on the business profile page. Learn more Marketing Message Line 1: [　　　　　　　　　　　　　　] (35 characters)

Marketing Message Line 2: [　　　　　　　　　　　　　　] (35 characters)

| | |
|---|---|
| Business Name: | Hamstead Realty |
| Address: | 50 Lee Ave. |
| City, State, Country: | St. Louis, MO, USA |
| Zip: | 63117 - |
| Phone: | ( 314 ) 972 - 2801 |
| Web Site URL: | www.hamsteadrealty.com |
| Tag Line: | Find a home with us |
| Description: | Experienced agents to assist you. Free guides & market analysis. |

FIG. 14

| Featured Listings | Name (Show Topic) | Rating | Rate | Availability |
|---|---|---|---|---|
| | Life Lessons<br>Relationship issues? (Details) | ★★★★★ (251) | $1.25 | Call Now |
| | Doctor We<br>Relationship results. | ★★★★☆ (51) | $1.20 | Call Now |
| Top Availability | Name (Show Topic) | Rating | Rate | Availability |
| | Joe Smith<br>Relationship help. | ★★★☆☆ (12) | $1.20 | Call Now |

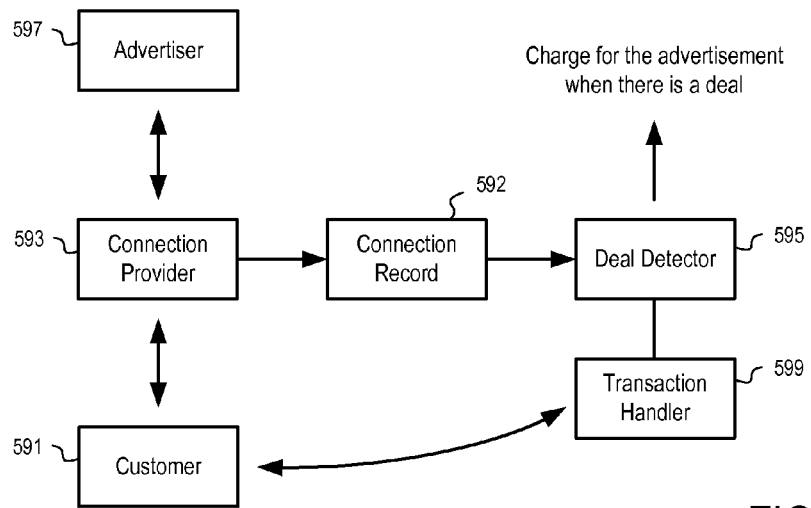

FIG. 19

Define a Deal   [?] Help

You pay for your advertisement for each deal you get from the customer's call generated from your advertisement. You can define what you deem as a deal event.

Deal Event:
- ☐ The customer agrees to pay
- ☐ The customer places an order
- ☐ The customer places a bid
- ☐ The customer visits my web page at this URL: [         ]
- ☐ The customer presses the submit button in the above web page
- ☐ The customer agrees to provide an address to me
- ☐ The customer answers the following question(s)
    Question 1: [         ]   > More Questions
- ☐ I/We say there is a deal by dialing this sequence: [         ]

┌─ 671
| Your Offer of Advertisement Fee  [?] Help |
| You pay for your advertisement for each deal you get from the customer's call generated from your advertisement. You can define how much you offer to pay for each deal. |
| Advertisement Fee: |
| ☐ This percentage of what the customer pays: [    ] % |
| ☐ A lump sum of: [$    ] per deal |
| ☐ This percentage of what I pay the customer: [    ] % |
| ☐ A subscription fee of: [$    ] per month if I/we get more than [    ] deals per month |
|   ⋮   |

FIG. 21

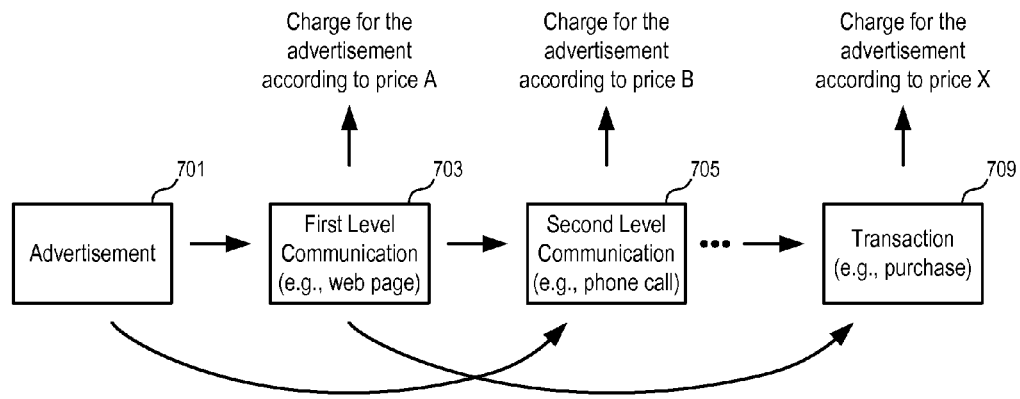

FIG. 22

Advertisement Fee:

☐ If no call, $ [ ] per qualified click
☐ If no deal, $ [ ] per qualified call  721
☐ When there is a deal, $ [ ] per deal  723
                                        725

⋮

SYSTEMS AND METHODS FOR DYNAMIC PAY FOR PERFORMANCE ADVERTISEMENTS

CROSS-REFERENCE TO RELATED APPLICATIONS

The present application claims priority from Provisional U.S. Patent Application Ser. No. 60/949,800, filed Jul. 13, 2007 and entitled "Systems and Methods for Dynamic Pay for Performance Advertisements," the disclosure of which is incorporated herein by reference.

The present application is related to U.S. patent application Ser. No. 11/624,613, filed Jan. 18, 2007 and entitled "Methods and Apparatuses for Pay for Deal Advertisements", and U.S. patent application Ser. No. 11/688,245, filed Mar. 19, 2007 and entitled "Methods and Apparatuses for Prioritizing Featured Listings", which is a continuation in part application of U.S. patent application Ser. No. 11/559,860, filed Nov. 14, 2006 and claimed priority from Provisional U.S. Patent Application 60/862,707 filed Oct. 24, 2006, which is a continuation in part application of U.S. patent application Ser. No. 11/072,147, filed Mar. 3, 2005 and claimed priority from Provisional U.S. Patent Application Ser. No. 60/656,637 filed Feb. 25, 2005. The disclosures of the parent applications are incorporated herein by reference.

TECHNOLOGY FIELD

At least some embodiments disclosed herein relate to communication connections and advertising in general and, more particularly but not exclusively, to performance-based advertising to provide connections for real time communications, such as connecting people for telephonic conversation, chat in text, voice and/or video, document sharing, screen-sharing, application sharing, etc.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, in one form of performance-based search advertising, an advertisement is included within a result page of a keyword search. Each selection ("click") of the advertisement from the results page is the measurable event for which the advertiser pays. In other words, payment by the advertiser is on a per click basis in such advertising.

SUMMARY

Methods and apparatuses to dynamically determine the performance event of a listing based on the progress levels of responses received in response to a presentation of the listing are described here. Some embodiments are summarized in this section.

One embodiment includes: providing a listing on behalf of an entity for presentation to a user; identifying an event from a set of predetermined events based on communications made by the user responsive to a presentation of the listing; and charging the entity a fee per the event identifying from the set of predetermined events.

The present disclosure includes methods and apparatuses which perform these methods, including data processing systems which perform these methods, and computer readable media which when executed on data processing systems cause the systems to perform these methods.

Other features of the disclosure will be apparent from the accompanying drawings and from the detailed description which follows.

BRIEF DESCRIPTION OF THE DRAWINGS

The present disclosure is illustrated by way of example and not limitation in the figures of the accompanying drawings in which like references indicate similar elements.

FIG. 2 illustrates a user interface for the creation of an advertisement according to one embodiment.

FIG. 14 illustrates a user interface to upload information of a listing according to one embodiment.

FIG. 15 illustrates a way to present featured listings according to one embodiment.

FIG. 19 shows another method to track a deal resulting from a real time communication connection provided in response to an advertisement according to one embodiment.

FIG. 20 shows an example of a user interface which allows an advertiser to define a deal for a pay per deal advertisement process according to one embodiment.

FIG. 21 shows an example of a user interface which allows an advertiser to specify an offer of an advertisement fee for a pay per deal advertisement process according to one embodiment.

FIG. 22 shows an example of dynamically determine the chargeable event for an advertisement based on the progress achieved via the advertisement according to one embodiment.

DETAILED DESCRIPTION

Figure 1:
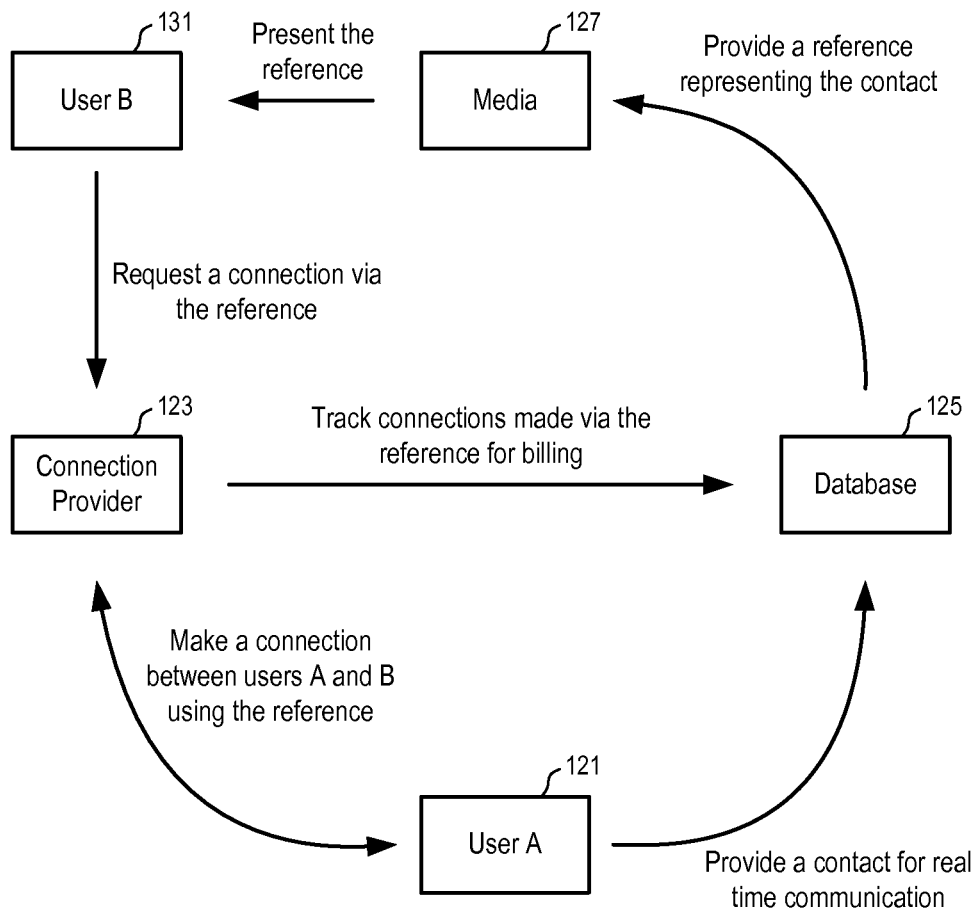
FIG. 1 shows a method to establish connections for real time communications according to one embodiment.

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

In one embodiment, a listing is presented to a user to provide the user with a communication reference, which can be used to request a connection for real time communications between the user and the entity of the listing, such as for telephonic conversations, instant messaging, chat in text, voice and/or video, screen sharing or application sharing, etc. The entity of the listing may be an advertiser who offers an advertisement fee for being presented, or a business entity, a seller, an advisor, an information provider, or a service provider, such as a provider for entertainment, amusement, etc. A listing may include text, graphical presentation, and/or audio or voice.

A listing may or may not be provided on behalf of an advertiser for a fee. For example, a directory service provider may compile listings of some businesses or sellers without the businesses or sellers explicitly request the directory service provider to advertise for them. A business or seller presented by a listing may or may not pay an advertisement fee for the presentation of the listing and/or for the lead to the customers resulting from the presentation of the listing.

For example, a community of users may create listings of businesses, sellers, etc. based on the recommendation of the users. In one embodiment, a listing can be created and edited by the community of users of telephonic apparatuses, such as softphones, cellular phones, or smart phones. The users can provide, edit, and/or modify a description, comments, ratings, etc., about a business or service provider that is identified by a telephonic reference, such as a telephone number of the business or service provider. Alternatively, the listings may have a portion of description that can be edited by the respective advertiser but not by other users. The listing database represents a business directory; and the entities represented by the listings may not pay any fee for being presented. Some of the entities may offer a fee for preferred placement in presentation. In one embodiment, the users may be charged a communication fee for communicating with the entities featured in the listings when the users use the softphones, cellular phones, or smart phones to communicate with the entities.

In one embodiment, an advertiser of an advertisement is charged an advertisement fee based on the performance of the advertisement (e.g., a telephonic connection to a customer, a lead for real time communication with a customer, a deal completed with the customer as a result of the performance, a subscription fee for a number of bundled leads or deals, etc.).

In one embodiment, a listing is provided to allow a customer to be connected to a seller; and the connection provider can charge the customer on behalf of the seller for transactions conducted over the connection provided between the customer and the seller. In one embodiment, the user terminals provided to the customer and the sellers are configured to charge the customer on behalf of the seller for the transactions. The customers and/or the sellers may also be charged for the communication connection. Alternatively, the communication connection may not be charged explicitly; and the communication cost can be covered via the commission fees for charging the customer on behalf of the seller and/or the advertisement fees.

In one embodiment, a presented listing includes a telephonic reference, which is used to identify an "end point" on a telephonic network for a telephonic connection to the "end point". The telephonic network may be a circuit switched network, or a packet switched network, or a combination of one or more circuit switched networks and one or more packet switched networks. For example, the telephonic reference may be a telephone number with an extension, a telephone number without an extension, a session initiation protocol (SIP) uniform resource identifier (URI), a user identifier of an instant messaging network, a user identifier of a Voice over Internet Protocol (VoIP) network, or a user identifier of a peer to peer VoIP network, etc.

In one embodiment, the telephonic references presented in some of the listings are references assigned by a connection server such that, when the references are used, the connection server is in the path of a call for a connection between the caller and the callee. For example, the connection server may be requested to call back the caller and to call the callee separately to connect the caller and the callee according to an assigned reference. For example, the connection server may receive a call, as an end point specified by an assigned reference, and then further connect the call to the callee based on the assigned reference used to receive the call. For example, the connection server may be queried to provide a telephonic reference of the callee according to an assigned reference to allow the caller's device to initiate the call to the callee using the provided reference. For example, the connection server may decrypt or decode an encrypted/encoded phone number of the callee for the caller's device and track the calls made by the caller's device through the decrypting or decoding process.

For example, in one embodiment, when an assigned reference is used to call for connections, the user is connected to a connection server as an end point. The connection server determines the communication reference of the advertiser based on the assigned reference used to connect the user and the connection server and then further connects the user to the advertiser. Through the use of the assigned reference, the connection server is in the path of connecting the user and the advertiser to track the connection made via the advertisement.

For example, the assigned reference can be a telephone number of the connection server, which when called by the user can be used to determine the telephone number of the advertiser; and the telephone number of the advertiser can be used to further connect the call to the advertiser. For example, the assigned reference may be a reference to request a callback to the user to connect to the advertiser. For example, the assigned reference can be an identifier of the advertiser, such as a user ID of the advertiser, a SIP URL of the advertiser, etc. The assigned reference can be passed to the connection server in a call signaling message of a VoIP call, be used to request a server to resolve the reference into a direct reference for use in a network, or be used to report to a server about the call to the advertiser.

In another embodiment, the telephonic references for some of the listings are designed to be used on telephonic apparatuses which are configured to track the calls made via the telephonic references and/or to report the calls made via the telephonic references. Thus, information about the calls made via the telephonic references can be used at a server to bill advertisers per connections made via the advertisements, to charge the customers on behalf of advisers (or sellers, service providers), to compensate partners based on the call activities, etc.

In a further embodiment, the telephonic references for some of the listings are designed to be used on telephonic apparatuses which are configured to maintain account information, or to communicate with servers of financial institutions to bill advertisers, and/or charge the customers on behalf of advisers, sellers or service providers.

In one embodiment, the user terminals that are designed to make the connections via the advertisement use the assigned reference to track the connections and report to a server the connection made via the advertisement. For example, softphones can be designed to make direct connections over a peer to peer network, without going through a centralized connection server. The softphones can be configured to report the calls made via the advertisements to a server for tracking. Alternatively, the softphones may be configured to deduct fees, or transfer funds, via accounts maintained by the softphones, or accounts accessible individually by the softphones.

In one embodiment, a click to call button includes a reference to the callee, which when selected, causes a telephonic apparatus used by the user, such as a softphone, a cellular phone, or a smart phone, to start a process to call the callee. The reference to the callee may be a SIP address of a connection server encoded with a phone number of the callee, which can be decoded by the connection server to further connect the call to the callee. The reference to the callee may be an encrypted phone number of the callee, which is to be decrypted by a server to allow the telephonic apparatus to call the callee directly (e.g., via a peer to peer network). In one embodiment, the reference can further include parameters such as the search terms used to locate the listings, the time stamp of the search, an electronic coupon/promotion, a bid price for advertisement fee, and/or a price for the service offered by a seller, etc. In one embodiment, the telephonic apparatus is configured to report a call resulted from the advertisement to a server for tracking and/or billing purposes.

In another embodiment, a click to call button is designed to request a connection server to call back to the customer for a connection to the entity of the listing. The click to call button may cause the presentation of an interface to guide the customer through the calling processing and/or to collect a callback reference from the customer (e.g., via a web page). In some embodiments, the callback reference, such as the telephone number of the customer, can be determined automatically from the identity of the customer, or the identity of the device used by the customer. For example, a telephone number of the customer can be looked up from the account of the customer after the customer is authenticated.

In one embodiment, a telephonic apparatus is a softphone implemented at least in part via software, such as an instant messenger, a VoIP client application running on a computer, an applet embedded in a web page, a built-in or plug-in module of a web browser, a handheld device, a personal digital assistant, a cellular phone, a cordless phone, a Bluetooth phone, a WiFi phone, etc. The telephonic apparatus may be designed to make a connection based on Internet Protocol, based on a peer to peer network, based on software, and/or based on a connection to a server or a host computer, etc. In some embodiments, the telephonic apparatus is implemented via hardwire circuitry, such Application-Specific Integrated Circuit (ASIC); in some embodiments, the telephonic apparatus is implemented partially via special purpose hardwire circuitry and partially via software, such as Application-Specific Integrated Circuit (ASIC) or Field-Programmable Gate Array (FPGA) with software/firmware; and in some embodiments, the telephonic apparatus is implemented using a set of general purpose hardwire components that are under the control of software.

FIG. 1 shows a method to establish connections for real time communications according to one embodiment. In FIG. 1, user A (121) provides a contact for real time communication, such as a telephone reference of the user A. The contact can be used to establish a connection with user A (121) through a communication network. For example, the contact can be a telephone number of a landline, traditional analog telephone, a cellular phone number, a phone number with an extension, a Universal Resource Identifier (URI) such as a Session Initiation Protocol (SIP) URI, a user identifier of a VoIP application, a user identifier of an instant messaging system, etc.

The contact of the user A (121) is stored in the database (125); and a reference is assigned to represent the contact. Instead of providing the contact to customers, the reference representing the contact is provided through the media (127) to user B (131). Thus, when the user B (131) uses the reference to request a connection with the user A (121), the connections resulted from the advertisement can be tracked to evaluate the performance.

In one embodiment, advertisements can be distributed via a number of media channels operated by a number of demand partners. The reference can also be assigned to identify the demand partners and/or the media channels used to distribute the advertisements. In one embodiment, the information obtained from tracking the demand partners who are responsible for the delivery of a communication lead is used to compensate the demand partner for each delivered communication lead. Alternatively, the demand partners may be compensated according to the advertisement presentations made for the advertiser; and tracked information can be used to determine the performance and/or the cost effectiveness of the media channels.

In one embodiment, the reference can be presented via a variety of media channels, such as a virtual reality environment, newspaper, magazine, telephone directory, web search results, VoIP user terminals, interactive maps, banners, directory assistance service, online marketplace, mobile communication devices, radio, cable/satellite television, interactive television, web television, voice portal, web portal, online auction site, blog, email, bulletin board, refrigerate magnet, brochure, etc.

In FIG. 1, the user B (131) can use the reference obtained from media (127) to request the connection provider (123) to establish a connection or facilitate a communication channel for real time communications between the user A (121) and the user B (131). The connection provider uses the database (125) to determine the contact of the user A (121) and then make a connection between the user A (121) and user B (131) using the contact of the user A (121). Alternatively, the reference may include an encoded/encrypted version of the contact of the user A (121) which can be decoded/decrypted without relying upon the database (125).

In response to the user B's request for a connection, the connection provider (123) may establish two separate connections to the user A (121) and the user B (131) and then bridge the two connections to connect the user A (121) and user B (131). For example, the connection provider (123) may determine the reference from a connection established between the user B (131) and connection provider (123) and then further bridge the connection to the user A (121).

In one embodiment, the connection provider (123) may provide a separate reference to represent the user B (131) and allow the user A (121) to subsequently callback to the user B (131) via the reference that represents the user B (131), if the user A (121) is not currently available for real time communications. The connection provider (123) may schedule an appointment for the user A (121) and user B (131) for a real time communication session. The connection provider (123) may send a notification to the user A (121) to inform the user A (121) about the request for a real time communication.

Alternatively, the user terminal of the user B (131) may provide the encoded/encrypted version of the contact of the user A (121) to the connection provider for a decoded/decrypted version of the contact of the user A (121) just in time when the user terminal of the user B (131) is ready to make a direct connection with a user terminal of the user A (121). For example, the user terminal of the user B (131) can use the decoded/decrypted contact of the user A (121) to make a peer to peer connection with the user terminal of the user A (121) without going through the connection provider (123); and providing the decoded/decrypted contact can be considered a proxy event of a connection between the user terminal of the user B (131) and the user terminal of the user A (121). Alternatively or in combination, the user terminal of the user B (131) and/or the user terminal of the user A (121) can be configured to report to the connection provider the connection between the user terminals. For example, a reporting message may include a call detail record (CDR), indicating the time period of the connection.

In one embodiment, the connection provider (123) tracks the connections made via the reference for billing for the advertisement. For example, the connection provider (123) may charge the advertiser for each communication lead deliver to the user A (121).

A communication lead may be limited to a distinct, separate customer such that repeated calls from the same customer within a predefined time period may not be counted as separate communication leads. In one embodiment, the communication lead may also be limited by the duration of a communication session, such that a short session having a duration shorter than a predefined time period may not be counted as a communication lead, and/or a long session having a duration longer than a predefined time period may be counted as more than one communication lead.

In one embodiment, a number of communication leads may be bundled as a package for a subscription fee, or a bid price. Further, the delivery of communication leads may be bundled with an offer of a telecommunication service package. Alternatively, the advertiser may specify a bid price that is to be charged for each communication lead delivered, or a bid limit (e.g., maximum bid) which is to be resolved into an actual bid based on the bid prices of competitors in a category for a specific geographic service area.

FIG. 2 illustrates a user interface for the creation of an advertisement according to one embodiment. The user interface may be presented via web in a web browser.

In FIG. 2, an interface (141) allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, an audio and/or visual advertisement is generated based at least in part on the information submitted by the advertiser via the user interface (141) (e.g., for presentation via virtual realty, directory assistance service, search result, etc.)

In one embodiment, a short audio advertisement is generated based on the concise marketing message (e.g., two sentences, each having a length limit, such as 35 characters). The concise marketing message can be read by a human to generated a recorded audio file for a short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. In response to a request from the customer, the visual component of the advertisement can be sent to the customer via an SMS message, via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web or a virtual reality environment, the short audio advertisement can also be included; and the audio advertisement can be played automatically or after the user selects the advertisement.

In FIG. 2, the interface (141) may be implemented as a web page. Alternatively, an advertisement may submit the advertising content via a custom client application, or via a message gateway (e.g., an instant message, an email, an SMS message, etc.). In one embodiment, one or more advertisements can be uploaded into a server via a spreadsheet, or via a web service interface.

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer, or a human announcer) when the audio advertisement is needed. In one embodiment, the machine synthesized audio recording are stored in the database for a period of time and deleted if not used after a predetermined period of time, or when the usage of the audio advertisement is lower than a threshold.

Figure 3:
FIG. 3 illustrates a user interface for the creation of a listing according to one embodiment.

FIG. 3 illustrates a user interface for the creation of a listing according to one embodiment. In FIG. 3, an entity can create a listing of service that can be delivered via a real time communication connection, such as a telephonic connection. The interface (143) allows the entity to specify a listing name with tags that can be used to categorize the listings and/or to facilitate searching. For example, the tags of the listing can be used to match with the search criteria of a customer, the content of document in which the listing is to be presented, etc.

In FIG. 3, the interface (143) allows the entity (e.g., an advisor, an entertainer, an information provider, a consultant, etc.) to specify the price of the service offered by the entity. For example, the entity may allow a customer to talk to the entity for free for a period of time specified in the entry box (145), or allow an indefinite period of free communication time. For example, the entity may request the customer to accept a charge after a period of free time, or request the customer to accept a charge before being connected to the entity. For example, the entity may request the customer to accept a per minute price before the customer is being connected to the entity for real time communication. Alternatively, the entity may provide a period of free communication time to the customer for a taste of the service, before requiring a per minute price specified in the interface (143).

In FIG. 3, the entity can also specify a price for a specified period of time, such as $25.00 for 30 minutes and a policy to continue beyond the 30 minutes. For example, the entity may request $25.00 for each additional 30 minutes in a communication session, or request the system to end the call after the initially purchased 30-minute communication session, or no long charge the customer if the customer wishes to continue the conversation beyond the initially purchased 30-minute communication session.

In one embodiment, the entity can specified a set of multiple prices for different purchase options; and the entity can negotiate with a customer during an initially free communication time period to select a price.

Alternatively, the entity may be compensated according to a flat rate specified by the system for services provided to the customers of the system.

Figure 4:
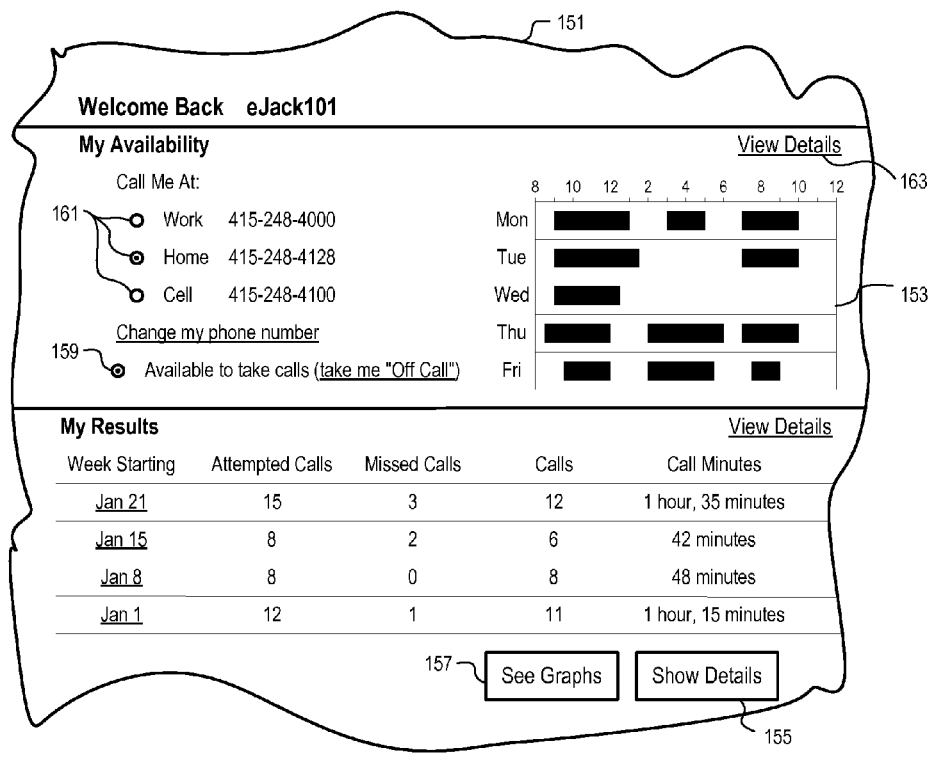
FIG. 4 illustrates an example of a user interface to manage availability for receiving phone calls according to one embodiment.

FIG. 4 illustrates an example of a user interface to manage availability for receiving phone calls according to one embodiment. An advertiser may specify the day and time of availability for accepting the calls for real time communications. Based on the availability, the system may schedule the presentation of the advertisements/communication references more effectively and block unwanted calls.

In one embodiment, the system can store multiple phone numbers of the seller. The system can intelligent route a call to the seller according to the preference of the seller. For example, in FIG. 4, the advertiser/seller may choose a preferred phone number from a set of phone numbers of the seller to receive incoming calls using the option group (161) in the user interface (151). The seller may indicate whether the seller is currently available to take calls or is to be taken "off call" (e.g., using the check box (159)).

In one embodiment, the owner of the listing (e.g., seller, advertiser, advisor, entertainer, consultant, etc.) can request the system to make concurrent calls to the multiple phone numbers. The owner of the listing can use any of the telephonic apparatuses connected at the multiple phone numbers to answer the call.

For example, an advertiser may have multiple telephonic apparatuses at different telephonic references. A connection server can assign a telephonic reference to an advertisement of the advertiser. When a customer calls the connection server at the telephonic reference assigned to the advertisement, the connection server can further connect the call from the customer to the advertiser via multiple concurrent calls to the different telephonic references of the advertiser. Thus, the advertiser can take the call to talk to the customer via any of the multiple telephonic apparatuses of the advertiser.

In one embodiment, during the conversation between the customer and the advertiser, the advertiser may request the connections server to reconnect the call to a different telephonic apparatus. For example, the connection server can place one or more separate concurrent calls to the telephonic references that are currently not in use for the conversation between the customer and the advertiser and then join the separate calls with the existing calls in a conference. This allows the advertiser to switch from one phone to another during the conversation and to bring family, friends, colleagues and/or third parties into the conversation.

In one embodiment, separate concurrent calls can be placed to the telephonic references of the advertiser that are specified prior to the customer's call, such as specified via the user interface (151). Alternatively, the advertiser can request a separate call to a telephonic reference specified in the request during the conversation with the customer. For example, the advertiser may provide the telephonic reference of a third party to invite the third party to join the conversation.

In one embodiment, the system is configured to drop the other concurrent calls when the one of the concurrent calls is answered. Thus, the first answering telephonic apparatus is selected for the connection, although multiple concurrent calls were initially placed.

In one embodiment, when multiple telephonic apparatus of the customer (or the advertiser) are answered substantially at the same time in response to the concurrent calls, one of the answering telephonic apparatus is selected for the connection while the others are disconnected. The selection can be performed based on a set of predefined priorities among the telephonic references, or based on statistics data about past answered calls. For example, the frequencies of the calls being answered on the multiple telephonic references can be used to select the telephonic apparatus that most frequently answered the previous concurrent calls (e.g., previous concurrent calls within the same time window of the day as the current call). For example, the telephonic apparatus that most recently answered the prior concurrent calls can be selected for the current connection request. Alternatively, a random selection from the answering devices can be used to select telephonic apparatus for the current connection request.

In one embodiment, the multiple telephonic references of the advertiser are called for up to a predetermined period of time to allow one or more of the multiple concurrent calls being answered. One or more answered calls can be joined with the call (or calls) with the other party in a conference. This provides a convenient mechanism to set up a conference call among multiple persons between the customer and the advertiser.

Alternatively, the multiple telephone numbers of the advertiser can be called sequentially to connect the advertiser to the customer.

In one embodiment, the system allows the seller to specify the schedule to receive calls; and the schedule (153) is displayed to the seller in a graphical way to help the seller to manage calls. In FIG. 4, the user interface (151) includes a link (163) which can be selected to display a user interface (not shown in FIG. 4) to manage the schedule (153).

In one embodiment, when the schedule or the check button (159) indicates that the advertiser/seller is currently not available to take calls for real time communications, the system can decrease the priority of the advertisement for this advertiser, or stop temporarily the presentation of advertisements for this advertiser. When there is a call intended for the advertiser at a time when the advertiser is not taking calls (e.g., according to the schedule), the system can block the call, or direct the call into a voice mail for the advertiser, or arrange a call at an alternative time, or obtain a callback number to allow the advertiser to initiate a callback to the customer.

In FIG. 4, the user interface (151) also includes a summary of call activities. Buttons (157 and 155) can be selected to show graphical representation of the call activities and further details of the call activities.

As the phone calls pass through the system, a wide array of information can be collected and tracked, including day/date/time of calls, duration of calls, call status (answered, no answer, busy), inbound phone numbers, etc. Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call or a single lead.

In one embodiment, different types of communication references can be dynamically selected for advertisements to represent the contact information of the corresponding advertisers. A communication reference used to represent the contact of an advertiser may be a traditional phone number with or without an extension, a click-to-call reference, a SIP address for VoIP call, a click-to-reveal reference, etc. The communication reference can be embedded into an advertisement to count the communication leads generated from advertisements, to track the contributions of demand partners who operate media channels to present the advertisements to customers, and/or to track other aspects of advertising, such as partners who bring the advertisers/sellers to the system and the keywords responsible for the selection of the advertisement for presentation.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is willing to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

Figure 5:
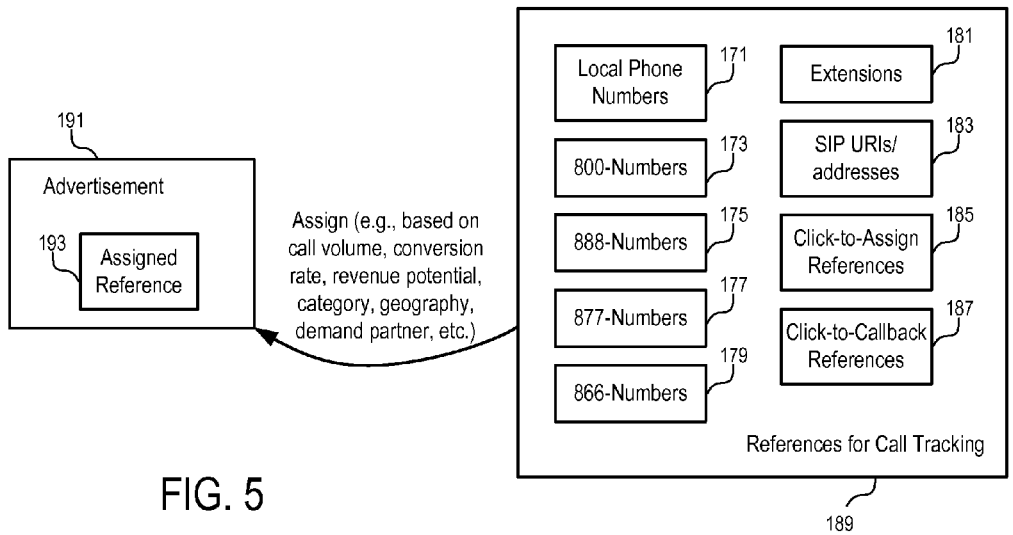
FIG. 5 shows a diagram illustrating a method to select a type of tracking mechanism with a corresponding reference for embedding in an advertisement according to one embodiment.

FIG. 5 shows a diagram illustrating a method to select a type of tracking mechanism with a corresponding reference for embedding in an advertisement according to one embodiment. In FIG. 5, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 5, a pool (189) of different types of references is maintained, such as local phone numbers (171), 800-numbers (173), 888-numbers (175), 877-numbers (177), 866-numbers (179). Some of the references can be dynamically generated and used, such as extensions (181), SIP addresses (183), click-to-assign references (185) and click-to-callback references (187). In one embodiment, one or more of the references are selected and used as the assigned reference (193) that is embedded in the advertisement (191). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a media channel, a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner or to a web browser of a customer). For example, the tracking mechanism used in an advertisement that is to be presented via a particular demand partner can be upgraded or downgraded based on the statistical data collected from the past activities related to the advertisement.

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further interface (e.g., a web page, a dialog box, etc.) can be displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. For instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement being called is estimated based on the type of media channels used to present the advertisement, the demand partner responsible to deliver the advertisement, and/or the customer who views the advertisement. Any characteristics in advertising that have an impact on the likelihood of an advertisement being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 6:
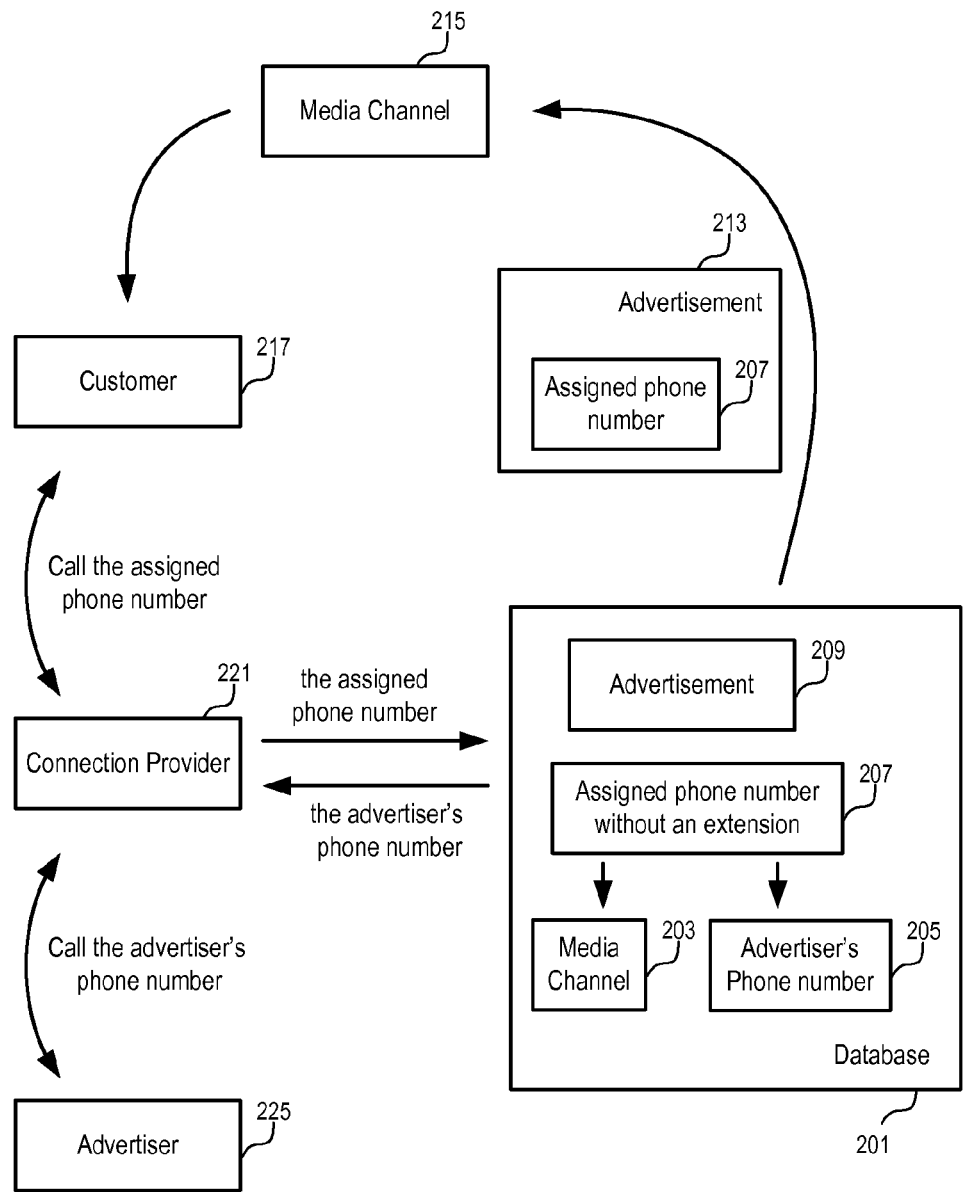
FIG. 6 illustrates an example of telephone call tracking mechanisms which can be selected according to one embodiment.

FIG. 6 illustrates an example of telephone call tracking mechanisms which can be selected according to one embodiment.

In FIG. 6, a phone number (207) without an extension is assigned for the generation a particular version (213) of an advertisement (209). In the database (201), the assigned phone number (207) is associated with the media channel (203) and the advertiser's phone number (205) (and/or other parameters to be tracked). Thus, the parameters to be tracked can be identified based at least partially on the assigned phone number (207). The particular version (213) of the advertisement (209) that has the assigned phone number (207) is provided to the customer (217) via the media channel (215). The advertisement may instruct or suggest the customer to call the assigned phone number (207) to reach the advertiser. In response to the advertisement, the customer may call the assigned phone number (207). When the connection provider (221) is called at the assigned phone number via a telephone carrier, the connection provider (221) can identify the assigned phone number (e.g., via a Dialed Number Identification Service (DNIS)) and determine the advertiser's phone number (205) based at least partially on the assigned phone number (207). Further, using the assigned phone number, it can also be determined that the phone call from the customer is a response to an advertisement that is delivered via the media channel (215) based on the association between the assigned phone number (207) and the media channel (203) in the database (201).

In one embodiment, after determining the advertiser's phone number from the assigned phone number that is dialed by the customer (217), the connection provider (221) makes a separate call to the advertiser (225) via a telephone carrier. When both the customer (217) and the advertiser (225) are on the line with the connection provider (221), the connection provider (221) can bridge or conference the calls to connect the customer (217) and the advertiser (225). Alternatively, the connection provider (221) may forward the calls from the customer (217) to the advertiser (225) after determining the advertiser's phone number.

In one embodiment, the assigned phone number can be a phone number that is local to the area to be served by the advertisement. Alternatively, the assigned phone number can be a toll free phone number, such as an 800- (888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Since maintaining different phone numbers may increase the tracking cost, another type of tracking mechanism uses different extensions to differentiate tracked parameters. For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

In one embodiment, after the customer dials the root number, the customer is connected to an IVR system or a human operator of the connection provider/tracker. After the customer provides the extension to the IVR system or the human operator, the tracked parameters, such as the media channel and/or the advertiser's phone number, can be determined.

In one embodiment, the IVR system or the human operator can prompt the customer for the extension that is provided in the advertisement. When the dialed root number is sufficient to identify information about the media channel, the IVR system or the human operator may customize the prompt to include the information of the media channel and ask the customer to further provide the extension to reach the desired advertiser. When the dialed root number is sufficient to identify information about the advertiser, the IVR system or the human operator may customize the prompt to include the information of the advertiser and ask the customer to further provide the extension to reach the desired advertiser.

The extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database. Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, the connection provider calls the customer instead of providing a phone number to receive a phone call from the customer. For example, the reference assigned to represent the contact of the advertiser may not be used to make a call via a traditional telephone carrier. The reference can be submitted to the connection provider via a data communication, such as an email, an SMS message, a web request, or other types of data communication. The reference can be used as a key in the database to look up the associated parameters, such as the media channel and the advertiser's phone number. In one embodiment, the reference is an encoded/encrypted version of the associated parameters, such that an authorized data system can decode/decrypt the information without having to look up from the database. After the reference is provided to the connection provider with the request for a connection, the connection provider can callback to the customer to establish the connection between the customer and the advertiser. The request may include a callback phone number of the customer. Alternatively, a customer may be prompted to provide the callback phone number in response to the request. The connection provider can connect the customer and the advertiser by calling the customer and the advertiser separately and bridge/conferences the calls, or by forwarding one call (e.g., the call to the customer) to another (e.g., to the advertiser).

In one embodiment, a telephone number assigned to a version of an advertisement includes a SIP address for the initiation of a VoIP-based telephone call. The SIP address can be used for a manually dialed call on a SIP-enabled phone, or be used in a click to call format. In one embodiment, the SIP address includes an encoded/encrypted version of the contact of the advertiser such that the connection provider can decode/decrypt the contact of the advertiser from the SIP address without having to look up from database.

In one embodiment, the allocation of a telephone number to an advertisement is deferred to a stage when a customer is interested in the advertisement and ready to make a phone call. A reference embedded in the advertisement can be used to specifically request for the telephone number that is assigned to the advertiser by the connection provider. The request can be sent as a web request in response to a click on a link, or as an email, an SMS message, or an instant message. The assigned telephone number may be a toll free phone number without extension, a local phone number with an extension, a SIP URL, etc. Alternatively, the reference can be used to request the actual phone number of the advertiser.

Figure 7:
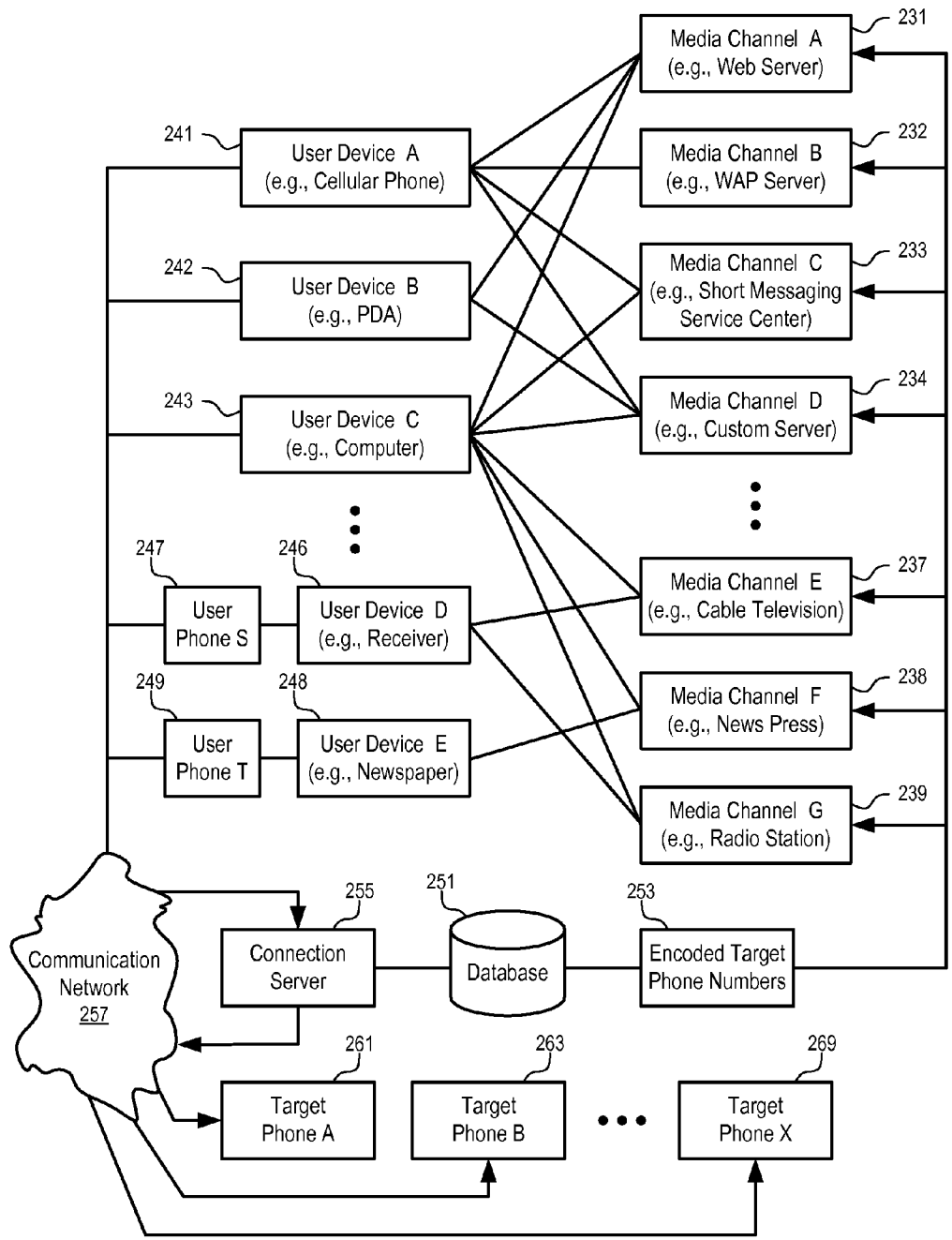
FIG. 7 shows a diagram of a system to make and track phone connections according to one embodiment.

FIG. 7 shows a diagram of a system to make and track phone connections according to one embodiment. In FIG. 7, a database (251) may contain the phone numbers of target phone A (261), target phone B (263), . . . , target phone X (269), etc. Typically, the target phones belong to the institutions, businesses, individuals, etc, which seek for publicity through various media channels, such as media channel A (231) (e.g., web server), media channel B (232) (e.g., WAP server), media channel C (233) (e.g., short messaging service center), media channel D (234) (e.g., custom server), media channel E (237) (e.g., cable television), media channel E (238) (e.g., news press), media channel G (239) (e.g., radio station), and others such as virtual reality, directory assistance service, interactive maps, etc.

In one embodiment, the phone numbers of the target phones are not directly publicized over the media channels. Instead, encoded target phone numbers (253) are used. Using the encoded target phone numbers (253), a user cannot reach target phones directly. The encoded target phone numbers (253) allow the association of additional information with the target phone numbers, such as the media channels used, special promotions, etc.

The encoded target phone numbers are delivered with content information (e.g., web page, WAP page, short message, television programs, news articles, virtual reality, etc.) to user devices, such as user device A (241) (e.g., cellular phone), user device B (242) (e.g., personal digital assistant (PDA)), user device C (243) (e.g., computer), user device D (246) (e.g., receiver), user device E (248) (e.g., newspaper).

In one embodiment, a user device can include a USB phone, a Bluetooth wireless phone, or one or more speakers or headphones with one or microphones for the implementation of a software based phone (softphone).

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. In one embodiment, the user devices/phones support the display of virtual reality.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (247) or user phone T (249).

In one embodiment, dialing at least a portion of an encoded target phone number connects the phone call to a connection server (255) first. According to the encoded target phone number dialed, the connection server (255) determines the corresponding target phone number using the database (251) and connects the phone call to the corresponding target phone (e.g., one of target phones 261-269) through the communication network (257).

Note the communication network (257) may be circuit switched, packet switched, or partially circuit switched and partially packet switched. For example, the telephone network may partially use the Internet to carry the phone call (e.g., through VoIP). For example, the connection between the user phone/device and the connection server (255) may be carried using VoIP; and the connection between the connection server (255) and the target phone may be carried using a land-line based, circuit switched telephone network.

In one embodiment, the information associated with the encoded target phone number, such as the media channel used to provide the encoded target phone number to the users, is also decoded/retrieved using the database (251). Thus, the information associated with the encoded target phone number can be tracked/stored.

In one embodiment, the connection server (255) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the connection server (255). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the connection server (255) through the communication network (257); and a second portion of the encoded target phone number is to be decoded by the connection server (255). For example, the Dual Tone Multi-Frequency (DTMF) decoder can be installed in the connection server (255) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the connection server (255) for different target phone numbers; and the portion of the encoded target phone number that is used to reach the connection server (255) is not used in determining the information associated with the encoded target phone number.

Alternatively, multiple telephone numbers can be used to reach the connection server (255); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (251) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the connection server (255). When such a mapping scheme is used, a look up table is not necessary. For example, an encoded target phone number may include a first portion that is the phone number of the connection server (255), a second portion that is the target phone number appended with a number mapped from an identifier of the media channel. To prevent the user from dialing the target phone number directly, an encryption/scrambling scheme can be used to encode the second portion, which is decoded at the connection server (255).

In one embodiment, the connection server (255) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the connection server (255), pauses for a short period of time for the connection server (255) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 7, the user device initiates the phone call. Alternatively, a connection server may be used to initiate phone calls both to the user device (or a separate user phone) and the target phone and then join/bridge the phone calls to connect the user to the target phone. For example, when the user selects the encoded target phone number, the selection of the target phone number is transmitted to the connection server with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the connection server. Alternatively, the content information can be formatted so that the selection is sent directly to the connection server.

When the connection server starts the phone calls, the encoded target phone number can also include alphabetic characters (and/or other characters). The connection server can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the connection server connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the connection server.

For example, a toll-free number is published to advertise mortgage brokers in a particular geographic area. When a consumer dials the toll-free number, the call is routed to the highest bidding mortgage broker who is available in that market.

The connection server may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 8:
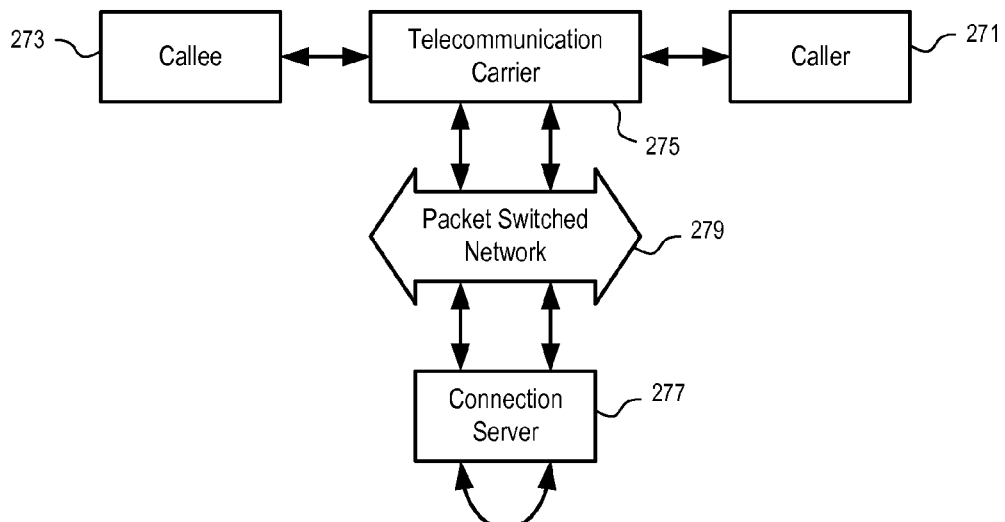
FIG. 8 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 8. In FIG. 8, the connection server (277) receives and/or places telephone calls via the telecommunication carrier (275) over the packet switched network (279). The telecommunication carrier (275) further routes the telephone communications towards the caller (271) and the callee (273).

Since the telecommunication carrier (275) can route a call from a packet switched network to a variety of destinations (e.g., a traditional analog telephone set, a mobile phone, a cellular phone, a WiFi phone, a Bluetooth phone, a softphone running on a computer, etc.), the connection sever (277) can use one type of communication connection with the telephone carrier (275) to facilitate the communication connections with variety of devices used by the customers (e.g., callers and callees). Thus, the implementation of the connection server (277) can be simplified. In one embodiment, the connection server (277) can also place and/or receive direct VoIP calls to/from the caller (or callee).

For example, to make a voice connection in response to a click-to-call request, the connection server can place separate VoIP calls, via the telecommunication carrier (275), to the caller (271) (e.g., the requester of the click-to-call) and the callee (273) (e.g., the destination of the click-to-call request).

If the caller (271) (or the callee 273) is on a public switched telephone network (PSTN), the telecommunication carrier (275) bridges the packet switched the network and the public switched telephone network (PSTN). The telecommunication carrier (275) routes the call from the packet switched network (279) to the caller (271) (or the callee 273) on the circuit switched network. Thus, the caller (271) (or the callee 273) can use a telephone set to receive the call via a Plain Old Telephone Service (POTS). The connection server (277) joins the separate calls that are placed via the packet switched network (279) to connect the callee (273) and the caller (271).

In one embodiment, call signaling and media content may use different network paths. While call signaling is arranged to go through the packet switched network (279) and the connection server (277), the media stream does not have to go through the connection server (277). For example, when the calls are joined, the media content may be redirected to flow over the communication carrier (275) without going through the packet switched network (279) to the connection server (277) for improved performance and efficiency. The connection server (277) can release the control over the media stream to allow the media stream to flow through the shortest path, without going through the connection server, while maintaining control to the connection for the call by staying on the path for call signaling.

In another example, when the caller (271) initiates a call over a PSTN to the connection server (277), the telecommunication carrier (275) converts the call for the packet switched network (279) for the connection server (277).

In one embodiment, virtual softphones on the telecommunication carrier (275) are assigned to the caller (271) and the callee (273) for interfacing with the connection server (277) over the packet switched network (279). The virtual softphones encapsulates the devices and networks used by the caller (271) and callee (273) to access the connection server (277); and the telecommunication carrier (275) shields the connection server (277) from the implementation details of the user devices and networks used by the caller (271) and the callee (273). The connection server (277) calls (or receives calls from) and connects the virtual softphones on the telecommunication carrier (275) to connect the caller (271) and the callee (273).

In FIG. 8, the telephone connection between the telecommunication carrier (275) and the connection server (277) is facilitated via a packet switched network (279). Thus, the connection server (277) can operate efficiently in a digital domain. The connection server (277) interfaces with the telecommunication carrier (275) using one type of Internet Telephony systems (e.g., SIP-based Internet telephony).

Alternatively, a connection server may include some or all of the functionality of the telecommunication carrier (275). For example, the connection server may be configured to bridge a packet switched network and a circuit switched network. The connection server may support multiple, different types of Internet Telephony systems.

In one embodiment, the connection server (277) and the telecommunication carrier (275) are operated by different, separate entities. Alternatively, the connection server (277) and the telecommunication carrier (275) may be operated by the same entity. In another embodiment, the telecommunication carrier (275) includes a set of facilities operated by a number of separate entities.

In one embodiment, the caller (271) and/or the callee (273) may also place/receive calls via a packet switched network. The telecommunication carrier (275) may route the calls between the caller (271) and the callee (273) without using a PSTN. In one embodiment, caller (271) and/or the callee (273) may place calls to or receive calls from the connection server (277) via Internet.

Figure 9:
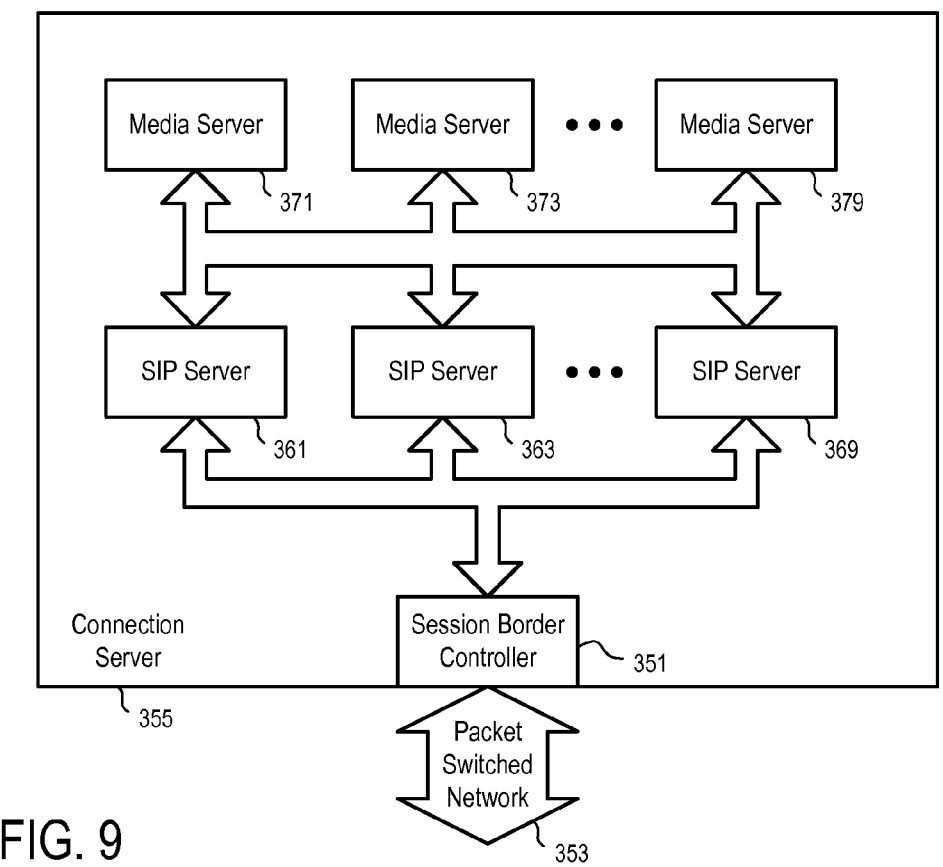
FIG. 9 shows a connection server according to one embodiment.

FIG. 9 shows a connection server according to one embodiment. In FIG. 9, the connection server (355) is configured to place and/or receive VoIP calls using Session Initiation Protocol (SIP). A session border controller (351) is used to interface with the packet switched network (353) and control the types of network traffic related to VoIP calls that might go into the connection server (355).

In one embodiment, the session border controller (351) is configured to control the signaling and media stream during the setting up, conducting and tearing down of VoIP calls to or from the connection server (355). In some embodiments, the session border controller (351) may pick up the call that comes to the session border controller (351), places a separate call from the session border controller (351), and joins the received call and the placed call to control both the signaling and media stream. In some embodiments, the session border controller (351) may perform signaling/encoding translation to allow the connection server (355) to process the VoIP calls in one standard, while receiving VoIP calls in a variety of standards (e.g., SIP, H.323, etc.). In one embodiment, the session border controller (351) is configured to perform one or more firewall functionalities, such as denial of service protection, call filtering, bandwidth management, etc.

In one embodiment, the session border controller (351) is configured to perform media releasing operation. When the session border controller (351) determines that the source and destination of a media stream is on the same side of the session border controller (351) (e.g., both the source and the destination of the media stream is outside the connection server 355), the session border controller (351) can release the hairpinning of the media stream and allow the media stream to flow without going through the session border controller (351).

In FIG. 9, a set of SIP servers (e.g., 361, 363, . . . , 369) are networked to the session border controller (351) to receive messages for incoming calls and to initiate outgoing calls. The session border controller (351) is configured to evenly distribute the calls for processing by the SIP servers.

For example, when an incoming message for the initiation of a call is received (e.g., a SIP INVITE message from the telecommunication carrier 275), the session border controller (351) may route it to a SIP server (e.g., 361) for processing. The INVITE message includes the phone number dialed by the caller and the contact information about the caller (e.g., the phone number of the caller 271 and/or the identity of the virtual SIP phone at the telecommunication carrier 275).

The SIP server may determine whether the phone number dialed by the caller (273) is sufficient to determine the phone number of the callee (e.g., 273). If the phone number of the callee (e.g., 273) can be determined from the phone number dialed by the caller (273) (e.g., via decoding the phone number dialed by the callee, or looking up the phone number of the callee from a table using the phone number dialed by the caller as a key), the SIP server can place a separate SIP call to the callee via the packet switched network (353) and then connect the caller and the callee. Alternatively, the SIP server can further route the SIP INVITE message (e.g., to the telecommunication carrier (275) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identify a media server (371) (or a virtual softphone on SIP server) as the initiator for a separate call. The SIP server then connects the calls for the media stream.

In one embodiment, the caller is first connected to a media server (e.g., 371, 373, or 379). For example, the SIP server may forward the SIP INVITE message to one or more of the media servers for answering the call. When a media server (e.g., 371) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (353) (e.g., by sending a SIP INVITE message to the telecommunication carrier 275, which further bridges the call to the callee 273). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (351) into the connection server (355). For example, the media stream can go through the telecommunication carrier (275) in FIG. 8 without going to the connection server (277) after the SIP server connects the caller and the callee.

However, the SIP server stays on the signaling path to monitor the progress and termination of the call. The SIP server can also break the connection between the caller and the callee, or force the media stream to come through the connection serve (355). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (353) for a connection to the caller. The SIP call may be bridged onto a circuit switched network (e.g., by a telecommunication carrier 275). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (361, 363, . . . , 369) and media servers (371, 373, . . . , 379) are implemented on separate computers connected via a local area network (and/or intranet or Internet). Alternatively, at least the some of the servers can be implemented on a same computer. In one embodiment, the SIP servers and the media servers are also integrated with the session border controller (351) on a same data process system having multiple processors coupled with a data bus. In one embodiment, the SIP servers are coupled to the media servers via a network; and a SIP server may use any of the available media servers for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (355) may further include a database server (355) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figures 10, 11:
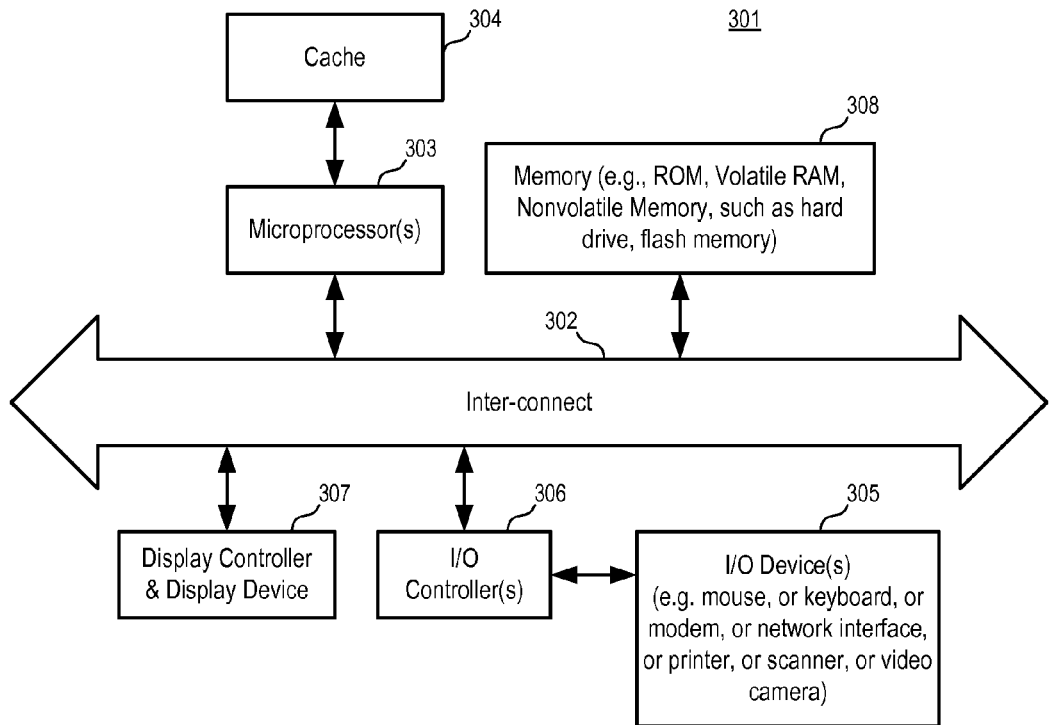
FIG. 10 shows a block diagram example of a data processing system which may be used in various embodiments.
FIG. 11 shows a user interface to arrange a callback to connect a caller to a callee for real time communications according to one embodiment.

FIG. 10 shows a block diagram example of a data processing system which may be used in various embodiments. While FIG. 10 illustrates various components of a computer system, it is not intended to represent any particular architecture or manner of interconnecting the components. Other systems that have fewer or more components may also be used.

In FIG. 10, the communication device (301) is a form of a data processing system. The system (301) includes an inter-connect (302) (e.g., bus and system core logic), which interconnects a microprocessor(s) (303) and memory (308). The microprocessor (303) is coupled to cache memory (304) in the example of FIG. 10.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 10 is used as one of the communication server(s), connection server(s), database server(s), media server(s), controller(s), router(s), gateway(s), etc. In some embodiments, one or more servers of the system can be replaced with the service of a peer to peer network of a plurality of data processing systems, or a network of distributed computing system. The peer to peer network, or a distributed computing system, can be collectively viewed as a server data processing system.

A user terminal as a client system can be a data processing system similar to the system of FIG. 10. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

In one embodiment, a user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. Other types of traditional communication client(s) may be used in some embodiments.

FIG. 11 shows a user interface to arrange a callback to connect a caller to a callee for real time communications according to one embodiment. For example, when the user selects a click to call reference, the user interface as illustrated in FIG. 11 can be presented.

In FIG. 11, the interface allows the user to specify a time window (321) in which the user is available for real time communications with the callee (e.g., advertiser, advisor, seller, etc.). The user can provide the one or more phone numbers of the user in the entry boxes (e.g., 323, 329). The user can select the control (328) to request further fields for more callback references. In other embodiments, the user can also provide other types of references for a real time communication, such as a member name, a user identifier, an account number, a screen name, a telephonic reference such as a SIP URI, a VoIP user ID, an instant messaging user identifier, etc. In one embodiment, the user can specified a number of callback references of different types, such as phone numbers with or without extension, SIP URIs, instant messaging user identifiers, etc.

In one embodiment, if the user has already signed in, the callback references (e.g., telephone number, user ID, etc.) can be obtained automatically from the user account and filled in the entry boxes (323 and 329) for confirmation by the user. In one embodiment, the user terminal (e.g., a softphone, a cellular phone, etc.) can automatically determine the one or more callback references of the user; and the automatically determined callback reference can be used to pre-fill the entry boxes (323 and 329) for confirmation by the user. Alternatively, when the callback references can be determined via the automated process, the system may initiate the connection process without displaying the interface as illustrated in FIG. 11.

In one embodiment, when the callee is available for real time communications with the user, the connection provider can call the phone number of the user to provide a connection between the user and the callee.

In one embodiment, when the advertiser is available to talk to the customer, the connection server can connect to the customer via multiple concurrent callbacks to the telephonic references of the customer. Thus, the customer can take the callback to talk to the advertiser via any of the multiple telephonic apparatuses of the customer. The system may connect the first answered callback to the advertiser and drop the other callbacks, or allow the customer to pick up more than one callback for a conference call.

In one embodiment, the connection server can initiate multiple concurrent callbacks to the customer and multiple concurrent calls to the advertiser to connect the customer and the advertiser. In one embodiment, the connection server receives a call from the customer and initiates concurrent calls to the advertiser to connect the customer to the advertiser. In one embodiment, the connection server establishes a connection with the advertiser and then initiates multiple concurrent callbacks to the customer to connect the customer to the advertiser.

In one embodiment, multiple concurrent calls are initiated from the user terminal of the customer or from the user terminal of the advertiser. The multiple concurrent calls may include one or more calls for peer to peer connections without going through a connection server.

In one embodiment, multiple calls can be initiated in the user terminal of the customer, or the user terminal of the entity of the listing. For example, when a link or icon button in an advertisement displayed on the softphone (or a mobile phone or smart) of the customer is selected, the softphone can be instructed to initiate multiple concurrent calls to the advertiser based on the multiple references embedded in the link or the icon button. In another example, the advertiser is provided with a message to call back the customer; and the message can include a link or icon button to cause the phone of the advertiser to initiate multiple concurrent callbacks to the customer. In one embodiment, the phone is instructed to make connection with the first answered one of the concurrently placed calls. Alternatively, the phone is instructed to establish a conference for all answered calls.

In one embodiment, a reference to the user request is provided to the advertiser/advisor to allow the advertiser/advisor to initiate the connection with the user for real time communications. For example, the system may send a message to the advertiser/advisor, including the reference to the user, to inform the advertiser/advisor that the user is interested in a callback within the time window specified by the user. The message can be sent via an email, an instant message, an SMS text message, a voice mail, a phone call, etc.

In FIG. 11, the user may further optionally provide a comment in the text field (325) to get the attention of the advertiser/advisor. In one embodiment, the comment provided in the text field (325) is sent to the callee (e.g., advertiser, advisor or seller) with the notification of the request. For example, when the callee is notified via a telephonic connection, the comment can be provided via a text to speech module. For example, when the callee is notified via a visual message, the comment can be included as text.

In FIG. 11, a visual interface is provided to a user to specify a callback number and a time window. Alternatively, the user may call a phone number assigned to the seller to specify the callback numbers and the time window and to record a voice message for the seller. The phone number can be a phone number local to the user, a toll free number (e.g., 1-800-Call-Bob), a telephone number with an extension, a SIP URI, an instant messaging user identifier, a VoIP user identifier, a user identifier of a peer to peer voice communication network, a member name, a click-to-call reference, a reference to a phone number, an Internet address for a voice connection, etc. When the phone number assigned to the seller is called by the user, the call is connected to a connection provider which prompts the user to specify a callback number, a time window, a voice message, if the seller is not immediately available to communicate with the user. In one embodiment, the connection server automatically determines the number of the user (e.g., via an automatic number identification (ANI) service) and ask the user to confirm the use of the number as the callback number. Alternatively, the callback number can be determined from the preference setting of the user, after the user is authenticated over the phone connection.

Figure 12:
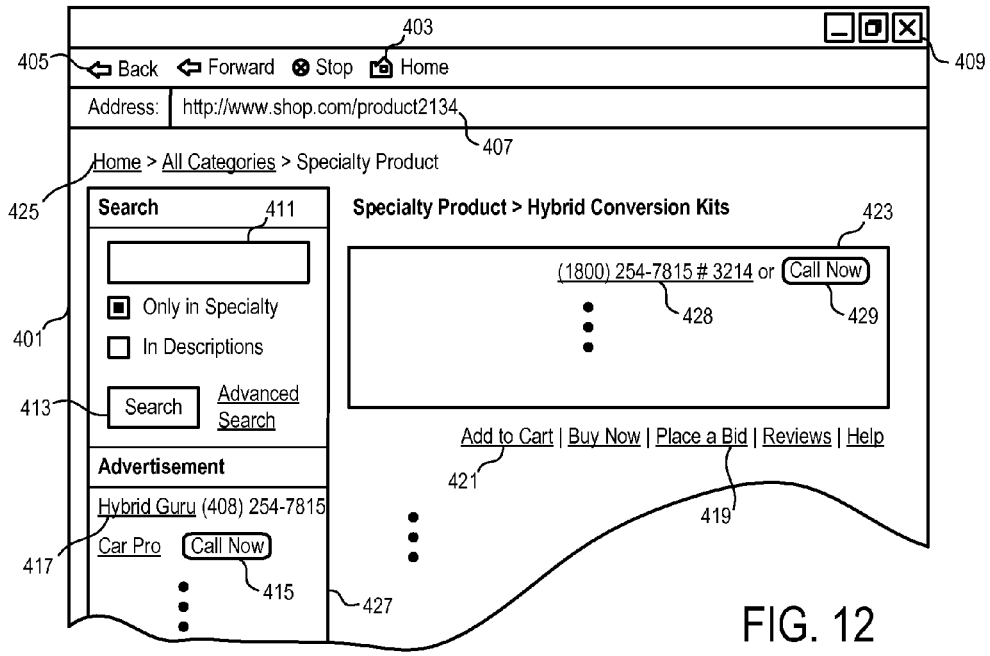
FIG. 12 illustrates an example of presenting information to connect people for real time communications according to one embodiment.

FIG. 12 illustrates the presentation of a document in a web browser (401). The components of the document may include one or more files retrieved by the web browser (401) from one or more servers over a network connection, and/or from a local file system. The servers may be on different domains on the Internet or within the same domain (or web site).

In one embodiment, the document is identified by the address specified in the entry box (407). The file at the location identified by the address may include links to other files at different addresses, which are loaded into the browser as components of the document. Thus, the file retrieved from the address specified in the entry box (407) can be considered as the root file that provides instructions to dynamically assemble the document for presentation in the browser window (401).

The document presented in the web browser (401) can include static content and/or dynamic content. For example, the document can include scripts or applets that dynamically generate content based on interactions with the user. The document may include multimedia streams (e.g., a video or audio stream), a static graphical image, entry fields, and/or selection boxes, etc.

In FIG. 12, the user may select the icon (409) to close the browser window (401) without going to a next document. The user may select one of the navigation buttons (e.g., 405, 403) to go a previously viewed document, with or without refreshing or reloading the previously viewed document. The user may enter a new address in the entry box (407) to visit a new document. The user can enter a search term in the entry box (411) inside the document and select the search button (413) to request a new search result. The user may select a link (417) or an icon button (415) of an advertisement presented in the document to exit the web site. The user may select a link (e.g., 425, 421, 419) embedded in the current document to load a new document without leaving the web site.

In FIG. 12, the document presented in the browser window (401) represents an e-commerce environment for selling a product (or service). The document may be implemented via a sells widget for presenting a listing of the product (or service) in the area (423) of the browser window (401). In one embodiment, the listing (423) includes an icon button (429) which is selectable to request a call back for a connection with the seller, or to initiate a call (e.g., via a VoIP module embedded in the browser window (401), or via a standalone telephonic module accessible via the browser window (401)).

In FIG. 12, the listing (423) also includes a telephonic reference (428) which can be used to call the connection server using a separate telephonic device for a connection to the seller via the connection server. For example, the customer can dial the telephone number (428) on a telephone separate from the device showing the browser window (401) to initiate a request for a connection to the seller. Although a telephone number of a connection server with an extension for the advertisement is illustrated in FIG. 12 as the explicitly displayed telephonic reference, other types references can also be used, such as a SIP URI, a user identifier of an instant messaging network, a VoIP user identifier, a toll-free number without an extension, a local number with or without extension, etc.

In some embodiments, the icon button (or hyperlink) is provided to allow the user to request the connection to the seller via click to call, without explicitly displaying the telephonic reference (428). In some embodiments, the telephonic reference (428) can be provided without an icon button (or hyperlink) for click to call. In some embodiments, the icon button (or hyperlink) for click to call (or click to dial) can be provided with an explicit presentation of the telephonic reference (428), as illustrated in FIG. 12.

In FIG. 12, the user may select the link (421) to register the product (or service) (e.g., adding the product to an online shopping cart) for a subsequent purchase transaction, or select the link (419) to place a bid in an online auction of the product (or service). For example, the user can select the "Buy Now" link to request a web page to complete a purchase transaction. For example, the user can select the "Reviews" link to request a web page of feedback, comments, recommendations, or suggestions that are provided by prior customers of the product (or service). For example, the user can select the "Help" link to request help information about the sells widget and/or a purchase transaction.

In FIG. 12, the document presented in the browser window (401) includes advertisements (427) that may be relevant to the product (or service) presented in the area (423). For example, the advertisements may include the listings of advisors who offer to provide advice, information, consultation, comments, suggestions relevant to the product (or service) presented in the area (427). The advisors may charge a fee for the service rendered over the communication connection established via the advertisement. In one embodiment, the user may request an initially free connection with the advisor; and after a period of time, the advisor may request payment from the user.

For example, when the user is connected to the advisor via a connection server (e.g., via using the telephonic reference of the connection server assigned temporarily to the advisor to request the connection), the advisor may request the connection server to charge the user on behalf of the advisor to continue the conversation after an initial free period of consultation. In one embodiment, the user may be required to pre-pay the advisor before being connected by the connection server to the advisor for a real time conversation in person.

For example, the user may be connected to the advisor via a peer to peer network, using a softphone, or an instant messaging application, which may be a standalone application or a built-in or plug-in module or an applet of a web browser. When a centralized server is not used in making the connection, the user terminal, such as the softphone or the instant messaging application can be configured to report the transaction to a centralized server for the payment processing, or process the payment via the accounts maintained on the user terminals, or to access accounts via the user terminals to process the payment.

Alternatively or in combination, the advertisements presented in area (427) may include the listings of an advertiser who offers similar products or services as the product (or service) presented in the area (423). Alternatively or in combination, the advertisements may include the listings of an advertiser who offers products or services related to the product (or service) presented in the area (427), in a way that user who are interested in the product (or service) presented in the area (423) are likely interested in these related products or services.

In one embodiment, the advertisements presented in the area (427) include references assigned to the advertisers (e.g., advisors, sellers, etc.). The assigned references can be used to request connections with the respective advertisers for real time communications.

In one embodiment, an advertiser is charged an advertisement fee per a connection with a customer established via the advertisement for real time communications. In one embodiment, an advertiser is charged a commission fee when the customer is charged for a transaction over the connection established via the advertisement. In one embodiment, an advertiser is charged an advertisement fee per a presentation of the advertisement. In other embodiments, a combination of fees can be collected for the advertisement, or a subscription can be charged for the advertisement. Alternatively, the advertisements can be presented without a charge.

In one embodiment, an advertisement fee is charged for the advertisement or listing presented in the area (427) or area (423) when the user is connected to the advertiser for real time communication. The advertisement fee may be an amount specified by the advertiser, or by the advertising system. In the embodiment, the advertisement fee is determined based on a bid for maximum price specified by the advertiser and the closest bid of the competitor of the advertiser.

In one embodiment, the operator of the web site (407) is compensated per the connection established via the advertisement.

In one embodiment, when an assigned reference is used to call for connections, the user is connected to a connection server as an end point. The connection server determines the communication reference of the advertiser based on the assigned reference used to connect the user and the connection server and then further connects the user to the advertiser. Through the use of the assigned reference, the connection server is in the path of connecting the user and the advertiser to track the connection made via the advertisement.

For example, the assigned reference may be a telephone number of the connection server, which when called by the user can be used to determine the telephone number of the advertiser; and the telephone number of the advertiser can be used to further connect the call to the advertiser. For example, the assigned reference may be a reference to request a callback to the user to connect to the advertiser. For example, the assigned reference may be an identifier of the advertiser, such as a user ID of the advertiser, a SIP URL of the advertiser, etc. The assigned reference can be passed to the connection server in a call signaling message of a VoIP call, be used to request a server to resolve the reference into a direct reference for use in a network, or be used to report to a server about the call to the advertiser.

In one embodiment, the user terminals designed to make the connections via the advertisement can use the assigned reference to track the connection and report the connection to a server for the connection made via the advertisement. For example, softphones can be designed to make direct connections over a peer to peer network, without going through a centralized connection server. The softphones can be configured to report the calls made via the advertisements to a server for tracking. Alternatively, the softphones may be configured to deduct fees, or transfer funds, via accounts maintained by the softphones, or accounts accessible individually by the softphones.

Although FIG. 12 illustrates various types of information presented in the document, the disclosure is not limited to the specific combination illustrated in FIG. 12. More or less information or different types of information can be presented in the document. In some embodiments, the documents are presented in the web browser; in other embodiments, the documents can be presented via other types of application programs, such as a spreadsheet, a word processor, a document editor, etc. In one embodiment, the document is presented on an apparatus which has the capability to establish the connections for real time communications, such as a softphone, or a cellular phone or a PDA based phone.

Figure 13:
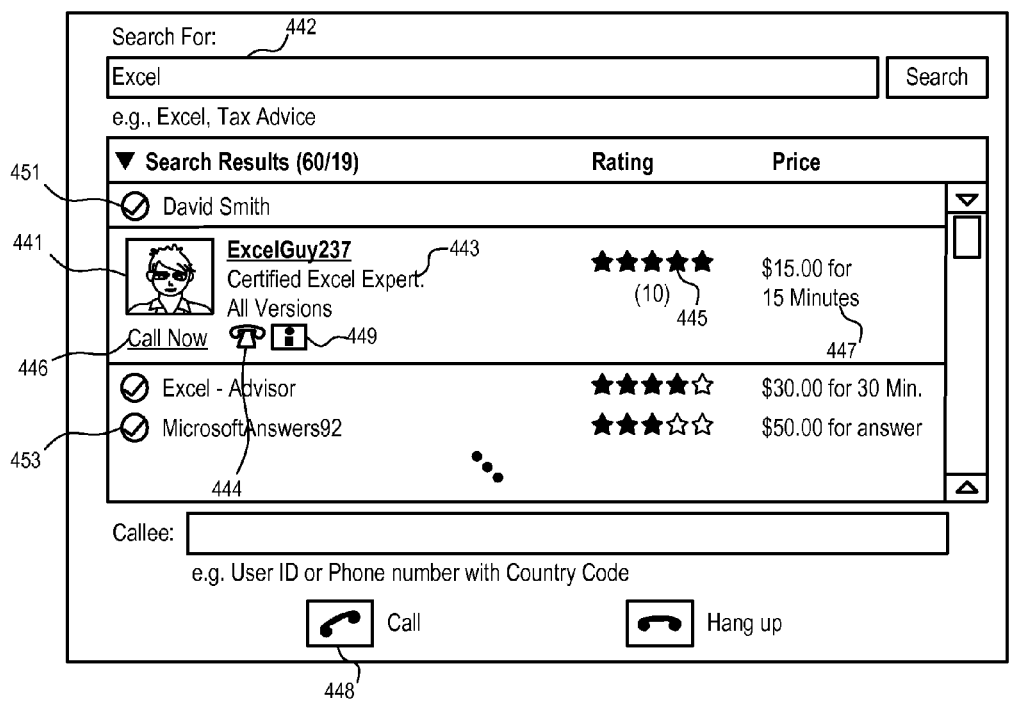
FIG. 13 shows an example of presenting a list of references on a telephonic apparatus according to one embodiment.

FIG. 13 shows an example of presenting a list of references on a telephonic apparatus according to one embodiment. In FIG. 13, the user may enter one or more key words (e.g., "Excel") in the search box (442) under the heading "search for" to indicate the requirement for the search.

FIG. 13 the search result includes one listing (451) from the personal address book of the user, one or more listings (e.g., 441) from a fee-based advisor database, and some listings (e.g., 453) from a business listing database.

In one embodiment, some top positions in the list of search results are reserved for listings retrieved from certain sources (e.g., address book and/or the advertisement database). For example, up to a first number of top positions can be reserved for the listings obtained from the personal address book; and up to a second number of next top positions can be reserved for listings from the advertisement database; and other listings can be mixed in the remaining positions of the list based on a ranking indicator, such as the earning potential for presenting the listings, the degree of matching to the search criteria, availability of the callee to communicate in real time at the time of the presentation of the listings, ratings of the customers, the prices of the sellers, etc.

In another embodiment, the priorities of the different sources are represented by different weights for sorting the results in a unified way. For examples, a ranking indicator may be evaluated based on a function of the earning potential, the degree of matching to the search criteria, and real time availability of the callee, and/or other considerations. To sort the listings from different sources in a unified way, the earning potential, the degree of matching to the search criteria, real time availability of the callee, and/or other considerations can be modified with a weighting factor assigned according to the priority of the source of the listing before being used in the ranking function to compute the ranking indicator.

In another embodiment, the list of search results are limited to a specific source. Alternatively, listings from different sources can be presented in separated areas designated for the different sources.

In one embodiment, when a listing is selected, an expended entry is displayed for the listing. For example, an expanded advisor entry shows a photo image (441) of the advisor, a description (443) of the expertise of the advisor, the rating (445) based on the experience of prior activity of the advisor, the price (447), etc.

In one embodiment, the expanded entry further includes an information icon (449), which can be selected to provide a profile page about the advisor. For example, the profile page may include the expertise of the advisor, the rate, a detailed description, social connections, and/or previous consumer feedback information, such as rating, comments, recommendations, etc.

In FIG. 13, the expanded entry includes a call icon (444) which can be selected to initiate a call to the advisor. Alternatively, the user can call the advisor via selecting the "call now" link (446) of the listing, or selecting the call button (448) while the listing is being selected/highlighted. In FIG. 13, the telephonic reference of the advisor is not displayed in the listing; and the user is encouraged to call via the telephonic apparatus. Alternatively, the telephonic reference of the advisor can also be displayed for the listing; and the user has the option to use a different telephonic apparatus to place the call.

In one embodiment, the appearances of the call buttons or links are rendered based on whether the advisor (seller, or advertiser) is currently scheduled to receive calls. If the call buttons or links are presented during a non-callable time period of the callee, such as when the current time is outside the scheduled hours for receiving calls or when the callee is currently off calls, the appearances of the call buttons or links are rendered to indicate that the callee is not currently available for real time communications; and the call buttons or links cannot be activated to call the callee. When the callee is not currently available for real time communications, the call buttons or links can be activated to schedule an appointment or request a callback.

FIG. 13 illustrates examples of visual interfaces for presenting the listings. Alternatively, the listings can be presented via an audio portal. For example, a user can call a phone number of a connection server for an interactive voice response system (IVR), which receives user specified search criteria and presented the search results obtained from different sources in a combined list.

FIG. 14 illustrates a user interface to upload information about a listing according to one embodiment. In FIG. 14, the user interface is in the form of a web page rendered in a web browser of a user device, such as a computer, a notebook, a PDA, a web terminal, etc. The web page is to be downloaded from a server that is connected to the database for the advertisements. Alternatively, the user interface can be based on a WAP application on a wireless mobile device, such as a cellular phone. Further, similar entry fields can be provided through the use of other communication channels, such as Email, Instant messages, SMS messages, etc. Further, an advertiser may fax a form, or make a telephone call, to provide the information to a human concierge, which uses such a user interface to enter the data into the database (e.g., using a custom application).

In FIG. 14, the user interface contains entry fields for specifying the information an advertiser wants to appear on the advertisement. For example, the "business name" field (503) is to receive the name of the advertiser, which can be used to identify the advertiser in the database and in the advertisement.

The address, city, state, country and zip fields (505, 507 and 509) are to receive the location information about the advertiser. The location is typically a site where a potential customer may visit to obtain services and/or products.

The "phone" field (511) is to receive the telephone number at which the advertiser is to receive phone calls from potential customers. In one embodiment, the phone number of the advertiser in the phone field (519) is not shown directly to the end users. An encoded/substitute phone number is used in the advertisement, so that when the encoded phone number is called the phone number of the advertiser is determined and connected to. This allows the tracking of phone calls generated from various advertisements for different advertisers and/or generated through different advertisement delivery channels.

The "web site URL" field (513) is to optionally receive a home web page address of the advertiser. In one embodiment, the advertisement is generated to contain a link to the web page as specified in the web site URL field (513) so that if the end user wants further details about the advertiser, the end user may click the link to visit the web page of the advertiser. In one embodiment, the advertiser is not charged for the link directing the web user to the web page of the advertiser. Alternatively, the advertiser may be charged for the link that is clicked to lead the web user to the web page of the advertiser. In one embodiment, the amount the advertiser is charged for the click is automatically computed from the pay per call price according to the click-through rate and call-through rate so that the average click-through revenue and the average call-through revenue is about the same.

In one embodiment, the advertisement is not to include a link to the web site URL (513). The web site URL (513) is used to obtain further information about the business of the advertiser so that the advertisement can be placed in relevant media channels.

For example, the web pages at the web site according to the web site URL can be fetched and analyzed automatically to determine topics, categories, keywords, content, etc., so that the placement of the advertisement can be based at least partially on the topics, categories, keywords, content, etc. to increase the chances of the advertisement being of interest to the targeted users.

The "tag line" field (515) and the description field (517) are to receive one or more concise statements about the business offering, the unique ways of meeting customers' needs, how the business stand out from the competition, etc. In one embodiment, the information in the description field is presented in a text form. In one embodiment, the text in the description field can be enhanced with boldface and italic type, as well as formatting, using a Rich Text Editor, as supported by Internet Explorer for Windows or Mozilla Browsers (e.g., Firefox, Netscape, etc.).

In one embodiment, further optional information, such as a logo, an electronic coupon, etc. (not shown in FIG. 14), can be specified for the advertisement. In one embodiment, to provide an electronic coupon, one can simply specify a coupon headline, description and expiration date (if any). The coupon information is then store in the database and presented with the advertisement.

In one embodiment, an advertiser can further specify a price bid for advertisement, logo, advertisement budget (e.g., in terms of the number calls per day, monthly spending limit, etc.), targeted geographic area(s) of customers, business categories, key terms, etc.

In one embodiment, a user interface can be displayed to edit or view information collected by the network for the supply affiliate, such as advertisement performance (e.g., call-through rate, total number of calls generated in a given time period, total charges/advertisement spending, rewards for the affiliate from the advertiser, etc.).

FIG. 15 illustrates a way to present featured listings according to one embodiment. In FIG. 15, a browser, such as a general purpose web browser or a custom application program, is used to present the listings of the advisors. The listings may be presented in response to the customer/user browsing through a hierarchical directory of categories, or a search request. For example, in FIG. 15, a keyword including one or more words can be specified in the entry box (not shown in FIG. 15) to initiate a search for listings that match the keyword.

In FIG. 15, a set of featured listings are presented on top of other listings to advertise the featured listings. The sellers of the featured listings may or may not offer a separate advertisement fee for featuring the listings. A value formula is used to compute the value scores of listings that are qualified to be featured (e.g., having a user rating above 3.5 and current availability for a connection with the customer for real time communications).

For example, the value scores of the qualified listings can be evaluated to rank the candidates. A predetermined number of top ranking listings can be selected as the featured listings. The featured listings are presented according to the value scores, while the other listings may be presented according to a different order, based on the rate (539), the rating (541), availability (543), name (or topic) (545), etc. A presented listing may also include an icon/image (e.g., 535) supplied by the seller/advertiser.

In one embodiment, when the seller/advertiser is available for real time communications, an icon button (e.g., 537) is also presented for the listing. The customer/user can use a cursor to select the icon button to request a connection to the seller/advertiser for real time communications, such as a telephone conversation, a text, voice and/or voice chat, and/or an application sharing session (e.g., screen sharing, common white boarding, etc.).

In one embodiment, when the seller/advertiser is not currently available for real time communications, an icon button (not shown in FIG. 15) can be displayed, which when selected, causes the browser to provide an interface for arranging an appointment for a call to the seller/advertiser.

In one embodiment, when the icon/image (535) of the seller/advertiser (or the link (547 or 549)) is selected (clicked), the browser displays detailed information about the listing. When the rating (551) is selected, selected feedbacks from prior customers of the listing is displayed. A selection of any of the links embedded in the listing can be a click, which can be qualified as a chargeable event for advertisement fee (e.g., a fee for featuring the advertisement). Example conditions for qualifying the click include the customer having provided payment information (e.g., a credit card number, a debit card number, a checking account number, a debit account number, etc.), the customer having not clicked more than a predetermined number of listings within a period of time, the customer having not made a purchase from the seller/advertiser within a period of time, the customer having not made a click on the listing within a period of time, etc. Some of the conditions may be satisfied or verified after the click; some of the conditions may be satisfied or verified before the click.

In one embodiment, a seller/advertiser may not offer an advertiser fee separate from the predetermined commission fees charged by the connection provider for transactions made via the communication connections provided by the connection provider. However, when the value score of such a listing is high enough, the connection provider may also present such a listing as a featured listing.

In one embodiment, the seller/advertiser may specify a bid price for preferential placement in featured listings. The listing management tool may display the bids of competitors to assist the seller/advertiser in determining a bid price for the advertisement fee. However, since the selection and placement of featured listings are based on the combination of the customer spending, the bid price, and the conversion rate, it is not easy for the seller/advertiser to determine a bid price based on the bid prices of the competitors.

In one embodiment, a listing management tool can determine the competitor listings that can be qualified as featured listings, determine the value scores of the competitors, and determine the actual bid that are required for the listing to have a value score ranked above the competitors. For example, the top list of value scores of the competitors can be converted into a list of actual bids for the listing to win various positions in featured listings. The actual bids can be provided to help the seller/advertiser in determining a price bid for getting the listing presented as a featured listing. In one embodiment, a seller/advertiser can place a maximum bid for a specific position in featured listings.

In one embodiment, a seller can budget advertisement spending based on revenue incomes generated. For example, the seller can allocate a percentage of the transaction revenue for preferential placement in featured listings to attract new customers (e.g., 10% of earned revenues). Thus, as the listing generates more incoming based on the connections established by the connection provider via the listings, the connection provider can automatically adjust the advertisement budget of the listing.

In one embodiment, the connection provider collects statistic data and presents the marketing acquisition costs. For example, since the advertisement fee is charged after the payment information from the customer is identified, the advertisement fee can be associated with the identity of the customer. When a call to the seller/advertiser is initiated from the customer, the connection provider may provide the seller/advertiser with the information about advertisement fees that have been paid to acquire this customer and the information about past spending of the customer on the listing. When there are more than one callers waiting in the line, the seller/advertiser may use such information to prioritize the queue of callers.

In one embodiment, the listing management tool also allows the seller to specify a budget limit for advertising to an individual customer. After a certain amount of advertisement fee has been paid to acquire the customer (e.g., $10), and/or a ratio between the accumulated advertisement fee spent on the customer and accumulated spending of the customer on the listing is above a threshold value (20%), the listing may not be presented as a featured listing to the customer.

In one embodiment, the customer is required to accept the price of the seller before being connected to the seller for real time communications between the customer and the seller. Alternatively, the customer can be connected to the seller for an initial free time period. The seller can request payment after talking to the customer for a period of time; and once the customer accepts the price of the seller, the system can charge the customer on behalf of the seller and compensate the seller accordingly.

In one embodiment, an advertiser is charged differently for different types of leads (e.g., phone call, email, instant messaging, video conferencing, etc.). An advertisement may be presented in a combination of different channels; and a lead generated from an advertisement may include connections for a combination of different types of media (e.g., text, audio, video, etc.).

Figure 16:
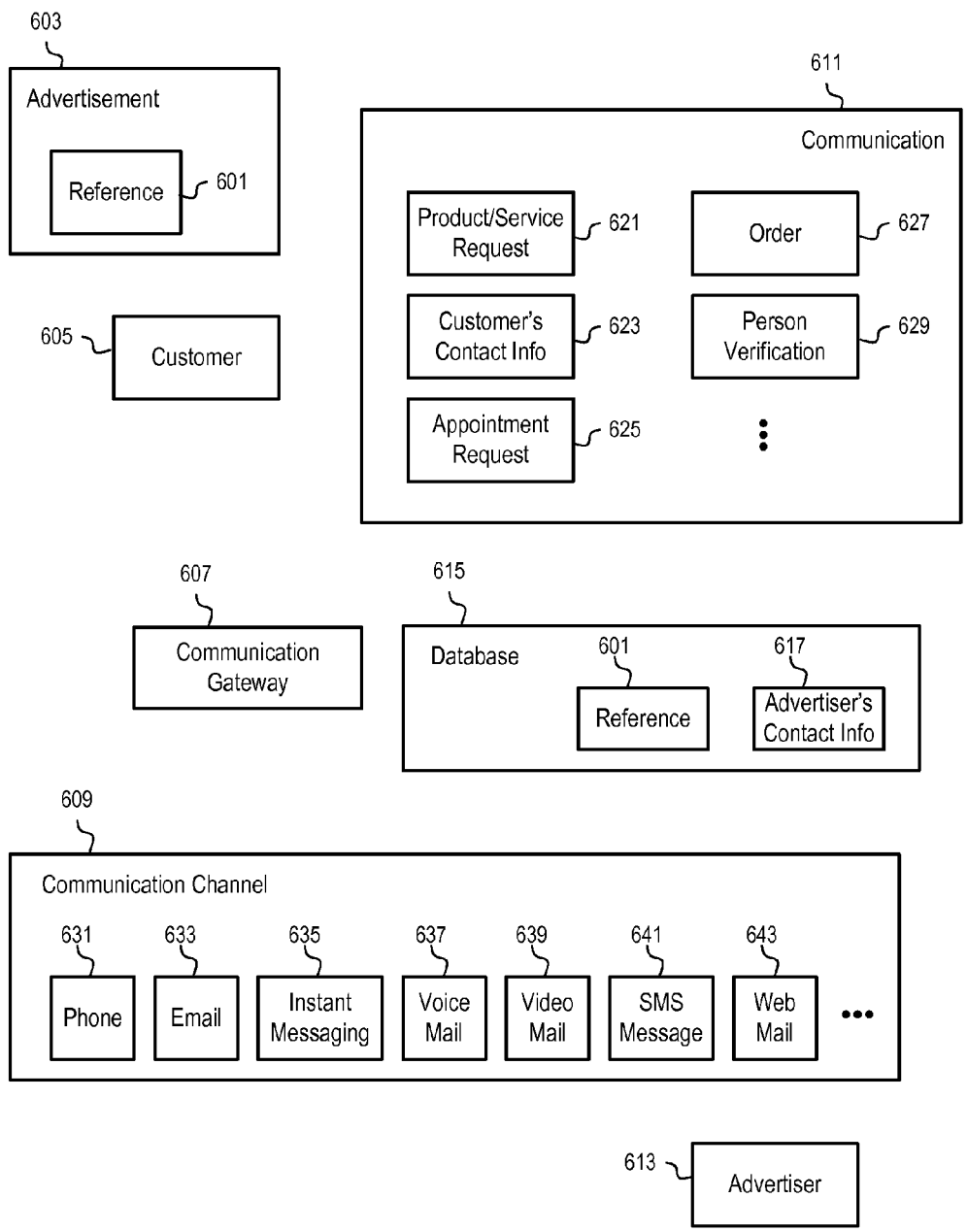
FIG. 16 shows examples of delivering communication leads according to embodiments.

FIG. 16 shows examples of delivering communication leads according to embodiments. In FIG. 16, an advertisement (603) is provided, on behalf of the advertiser (613), to the customer (605) together with a reference (601) which is used to facilitate the tracking of communication leads generated via the advertisement (603). In one embodiment, the advertisement is specific for the advertiser (613); and the identity of the advertiser (613) is presented in the advertisement. In one embodiment, the advertisement is exclusively for the advertiser (613); alternatively, the advertisement explicitly includes the identities of one or more advertisers.

In one embodiment, the communication (611) that is responsive to the advertisement (603) is transmitted from the customer (605) to the advertiser (613) via the communication gateway (607). Since the communication request is made via the reference (601), the communication gateway (607) can look up advertiser's contact info (617) from the database (615) based on the reference (601) to facilitate the transmission of the communication to the advertiser (613). Alternatively, the reference (601) may include an encoded or encrypted version of the advertiser's contact info, which can be decoded or decrypted without having to perform lookup from a database.

In one embodiment, the reference (601) is at least part of a phone number (e.g., a toll free number, a local number, a phone extension, a SIP URI (Universal Resource Identifier), a VoIP address, etc.), which can be used to request a phone connection. In other embodiments, the reference (601) may be a portion of a parameter for an HTML link which can be selected to request the arrangement of a communication with the advertiser, a portion of an email for requesting a communication with the advertiser via email, a portion of an instant messaging identifier for requesting a communication with the advertiser via instant messaging, etc. In one embodiment, multiple references are provided in the advertisement to allow the customer (605) to select a communication media for reaching the advertiser (613).

In one embodiment, a communication lead includes the delivery of the communication (611) from the customer (605) to the advertiser (613). When the communication (611) is delivered from a distinct customer (605) to the advertiser (613), the communication lead is considered being delivered to the advertiser (613); and the advertiser (613) can be charged a fee for the advertisement (e.g., according to a price bid on communication lead).

In one embodiment, a communication lead includes a communication connection provided to facilitate the communication between the customer (605) and the advertiser (613). In one embodiment, when the communication connection is readily available to the advertiser (613), the communication lead is considered being delivered to the advertiser (613); and the advertiser (613) can be charged a fee for the advertisement (e.g., according to a price bid on communication lead). For example, after the connection between the communication gateway (607) and the customer (605) is established and the advertiser (613) is contacted for the completion of the connection between the communication gateway (607) and the advertiser (613), the communication connection between the customer (605) and the advertiser (613) can be considered being readily available to the advertiser (613). In another embodiment, a communication lead is considered being delivered to the advertiser (613) after the communication connection is established between the customer (605) and the advertiser (613).

In one embodiment, a connection for transmitting and receiving communications in real time is provided to facilitate the communication between the customer (605) and the advertiser (613). The connection may support full duplex, voice communication, video communication and/or text communication.

In one embodiment, the transmitting of the communication (611) from the customer and the receiving of the communication (611) at the advertiser (613) may not be in real time. The communication (611) may be stored or queued and then forwarded to or retrieved by the advertiser (613). In one embodiment, no connection is provided to support full duplex, real time communication; and the delivery of the initial communication (605) from the customer is considered as the communication lead.

In one embodiment, the advertisement (603) is charged for based on the delivery of a lead to a customer who has sufficient interest in the advertisement to initiate a request for an in person communication with the advertiser. Such a customer is more interested in the advertisement than a person who is simply browsing for information. Such leads can be more valuable than forwarding a web visitor to a web site of the customer.

In one embodiment, the customer (605) makes the request for an in person communication via a communication channel that is typically used for in person communications, such as a real time communication that supports voice. For example, the customer (605) may request a phone connection with the advertiser (613). For example, the customer (605) may request an instant messaging session with the advertiser (613). For example, the customer (605) may request for a video conference session, or a shared application session (e.g., common whiteboarding). For example, the customer (605) may request to send an email, instant message, voice mail, video mail, SMS message, web mail, etc., to contact the advertiser (613).

In one embodiment, the customer (605) makes the request for an in person communication via providing information that is specific to the customer and that is typically not apparent to a web site that is being visited. The provided information may or may not be forward to the advertiser (613).

For example, the customer may provide the customer's contact information (623) to request that the customer be contacted by the advertiser (613) via the communication gateway (607). The customer's contact information (623) may be used by the communication gateway to establish a connection between the customer (605) and the communication gateway, or be provided to the advertiser (613) who may then initiate the connection directly with the customer (605). The customer's contact information may be used by the communication gateway in receiving the initial communication from the customer and/or in delivering the initial communication to the advertiser (613).

For example, the customer can provide the phone number of the customer to request the communication gateway (607) to establish a phone connection with the advertiser (613) without providing the phone number of the customer to the advertiser (613). For example, the customer can provide an email address to request communications with the advertiser (613) via email without revealing the email address to the advertiser (613). For example, the customer may provide a postal address to request communications via postal services. For example, the customer (605) may send an appointment request (625), a product/service request (621), a purchase order (627), etc., to the advertiser (613) in the initial communication to the advertiser (613). Alternatively, the customer (605) may provide the phone number, email address, or the postal address to the advertiser (613) via the communication gateway (607) such that the advertiser (613) can subsequently contact the customer (605) without the communication gateway (607).

In one embodiment, the customer (605) is verified as being a person before the communication gateway (607) allows a communication flow between the customer (605) and the advertiser (613). For example, a human operator may talk to the customer to receive the customer's request and determine whether the communication is from a person. For example, the customer may be required to provide person verification information (629) so that the communication gateway (607) can determine whether the communication request is indeed from a viable customer. In one embodiment, the customer (605) is required to be authenticated as a registered member of the system. In one embodiment, the communication gateway uses Completely Automated Public Turing test to tell Computers and Humans Apart (CAPTCHA) to make a determination on whether there is a human behind the communication request. In one embodiment, a CAPTCHA test is designed such that most human users can pass the test, but it is very difficult to design a software program to pass the test. Since the system made the attempt to verify that there is a viable customer behind the communication request, the lead is valuable to the advertiser (613).

In one embodiment, the customer (605) makes the request for an in person communication via a communication in a form that is typically used for in person communication, such as voice communication. For example, the communication may include audio, video, image and/and text messages.

In one embodiment, the customer (605) makes the request for an in person communication via particularly requesting a communication contact of the advertiser. For example, a hidden portion of a communication reference is revealed when a request from the customer (605) is received; and the user interface is specifically designed to allow the user to specifically request the communication reference such that a majority of users would perform the action to request the communication reference only when specifically interested in the initiation of the communication with the advertiser. For example, a graphical user interface button or link may be designed to state "click here to see the phone number of this advertiser".

In one embodiment, the information provided by the customer (605) in making the request for an in person communication with the advertiser (613) is used by the communication gateway (607) to forward responsive communications obtained from the advertiser (613) to the customer (605).

In one embodiment, the information provided by the customer (605) is provided to the advertiser (613) without expecting an in person response from the advertiser (613). For example, a purchase order, an appointment or reservation request can be sent to the advertiser (613) without an in person reply from the advertiser (613). For example, the communication gateway (607) can use the data collected from the customer (e.g., via a web page) to file a request with the advertiser (613); and the request can be filed by the communication gateway (607) on behalf of the customer, via a web form, a voice message, an email, or an application program interface, etc.

In one embodiment, the communication channel used between the communication gateway (607) and the customer (605) has the same type as the communication channel used between the communication gateway (607) and the advertiser (613). The communications are relayed/forwarded by the communication gateway (613). Alternatively, the communication gateway (607) may perform format conversion; and thus, the communication channel used by the customer to provide the communications to the communication gateway (607) may not be the same as the communication channel the communication gateway (607) used to provide the communication to the advertiser (613). For example, the communication gateway may receive a requesting communication via a web page and transmit the request to the advertiser (613) via instant messaging, voice mail, email, a phone call, etc.

A communication channel (609) used for the delivery of the communication lead may be phone (631), email (633), instant messaging (635), voice mail (637), video mail (639), SMS message (641), web mail (643), and/or other known types of communication channels.

One embodiment of the disclosure provides a pay per deal advertisement process in which advertisers pay an advertising network when a communication lead (e.g., a phone call) delivered by the advertising network results in a "deal" for the advertiser. A deal may be related to acquisition, purchase, exchange, auction, survey, delivery of a message, obtain an answer, etc. In a deal an acquisition or purchase may be made by the advertiser, or by the customer, for digital and/or physical goods, and/or for advice, entertainment, amusement, information or services delivered over the communication connection of the communication lead and/or offline, etc.

In one embodiment, the deal can be defined by the advertiser based on the purpose of the advertisement. For example, the advertiser may define an event that indicates the close of the deal for the advertisement. The system can then provide the advertisement and detect the occurrence of the event to charge the advertisement fee when the advertisement results in a deal as defined by the advertiser.

In one embodiment, the advertisement fee is charged when the pre-identified agreement between the customer and the advertiser is reached as the result of the advertisement. Thus, the advertisement fee correlates with the desired result of the advertisement, as defined by the advertiser, reducing or eliminating the uncertainty for the advertiser investing in the advertisement. In one embodiment, an interface is provided to an advertiser to facilitate the selecting or defining what the advertiser considers as a deal to be achieved via the advertisement; and the system monitors or detects the completion of the deal (or transaction) to charge for the advertisement fee.

In one embodiment, advertisements are presented to generate communication leads and allow the advertisers to close the deals via the communication leads. Various types of communication leads described above can be used. In one embodiment, a communication connection between a customer and an advertiser is provided via a connection provider to deliver and track the communication lead; and the communication connection is also provided to facilitate the communications needed to close the deal.

For example, a communication lead can be a phone call received via a dynamic number generated and displayed in an advertisement on websites, search results, banners, etc. In one embodiment, the phone connection is provided to facilitate the discussion between the customer and the advertiser to reach a deal; and the advertiser is charged for the advertisement when the customer and the advertiser reach a deal via the phone connection. In one embodiment, the advertiser is not charged a fee for the communication lead if there is no deal after the communication between the customer and the advertiser. In another example, a communication lead and connection is provided via a phone call received using a softphone (software phone); and the call results from a customer selecting a click-to-call icon of an advertisement presented in websites, search results, etc. A phone lead and connection can be provided via a phone call received at a phone number that is assigned to the advertiser/advertisement and presented in a media channel such as a static or dynamic billboard, Yellow Pages, magazine, newspaper, television, radio broadcasting, etc. The phone lead may be received via a directory assistance call. The communication lead and connection for real time communications can also be provided via instant messaging for communications in text, voice/audio, and/or video. The communication lead and the connection may also be provided via non-real time communications, such as voice mail, email, SMS, etc.

The advertisement fee that is to be paid for each deal can be a fixed price offered by the advertising network, a share of revenue received by the advertiser or a percentage of the payment made by the advertiser to the customer, and/or a specific lump sum bid price specified by the advertiser.

In one embodiment, the advertisement fee is to be charged for a deal in addition to a separate advertisement fee for the communication lead and/or other fees. Alternatively, the advertiser is charged the advertisement fee for the deal and not charged a separate fee for the communication lead. For example, when there is no deal following a communication lead, the advertiser is not charged for the communication lead; and thus, the advertiser is not charged for the leads that do not result in deals.

In one embodiment, a deal is arranged to be concluded or processed via the communication connection provided via the advertisement. For example, the payment or the delivery of the goods, service or information can be made via a communication over the communication connection provided via the advertisement; and the system can monitor the provided communication connection to detect the deal.

In another embodiment, the deal can be reached outside the communication connection provided via the advertisement. However, at least a portion of the deal is carried out via the system such that the system can tracked the completion of the deal to bill for the advertisement fee. For example, the system may facilitate the payment processing, delivering of goods or services, and/or the book keeping of records (e.g., via communications through an Application Programming Interface (API) provided by the system). The system can correlate the deal made via the system and the communication connection provided via the advertisement to charge the advertisement fees for deals that have been made with the help of the communication connections provided via the advertisement.

For example, the customer can be identified via a communication reference of the customer used in the communication lead. For example, the telephone number of the customer can be identified (e.g., via an ANI service, or as the callback number provided by the customer); and the telephone number of the customer can be used in a system (e.g., a Customer Relationship Management (CRM) system) that handles the transactions between the customer and the advertiser to identify the deals that are the result of the phone connections provided via the advertisement. For example, the Internet Protocol (IP) address of the customer can be used to correlate the communication connection (e.g., IP telephony or instant messaging) provided as a response to the advertisement and the deal made between the customer and the advertiser.

In one embodiment, after the communication connection is provided between the customer and the advertiser, a user interface is provided to the customer to carry out a transaction between the customer and the advertiser; and the user interface includes a reference to the communication connection to track the deal made via the communication connection.

Alternatively, the advertisement fee can be charged for a deal without having to check whether there is a communication connection provided for the deal. In one embodiment, a separate fee is charged if it cannot be determined whether a communication connection has been provided to assist the deal.

In one embodiment, a data communication channel is provided by the system to facilitate the conclusion of the deal while the customer and the advertiser communicate over the real time communication connection. For example, when a customer calls an advertiser via the connection provider, a user interface is provided on the softphone of the customer or a web browser to receive input from the customer. In one embodiment, the connection provider receives the user interface from the advertiser, relays the user interface to the customer, obtains the customer's input to the user interface, and relays the input to the user interface of the advertiser. In one embodiment, the connection provider provides an interface to the customer to complete the required actions for the deal and presents a mirrored version of the interface to the advertiser to assist the advertiser in communication with the customer. For example, the advertiser can walk the customer through the user interface and provide answers to questions raised by the customer to complete the required actions over the user interface (e.g., filling out a purchase order form, or a survey form, or placing a bid on an item offered by the customer, etc.).

Since the data communication channel is provided with the real time communication connection, a deal detected in the data communication channel can be attributed to the provision of the real time communication connection that is a result of the advertisement.

In one embodiment, after a real time communication connection is provided as a result of the advertisement, a user interface provided to the same customer for a transaction between the customer and the advertiser is modified to include a reference to the real time communication connection. Thus, the deals concluded as a result of the real time communication connection provided via the advertisement can be tracked.

In one embodiment, an arrangement is made to allow an advertiser to report a deal in the real time communication connection provided via the advertisement, or via a separate data connection. For example, in the phone connection to the customer made via the advertisement, the advertiser can dial a sequence (e.g., "#" or "*76") to indicate that there is a deal resulting from the communication lead. Alternatively, the advertiser can visit a web page to view recent phone calls received via the advertisement and mark the phone calls that resulted in deals. The advertiser may visit the web pages periodically after the phone leads, or mark the phone calls while the conversations resulting from the phone leads are in progress.

In one embodiment, the advertiser pays a subscription fee to receive communication leads, a fee based on the duration of the communication connections, and/or a separate advertisement fee for the deal when the deal is completed.

Figure 17:
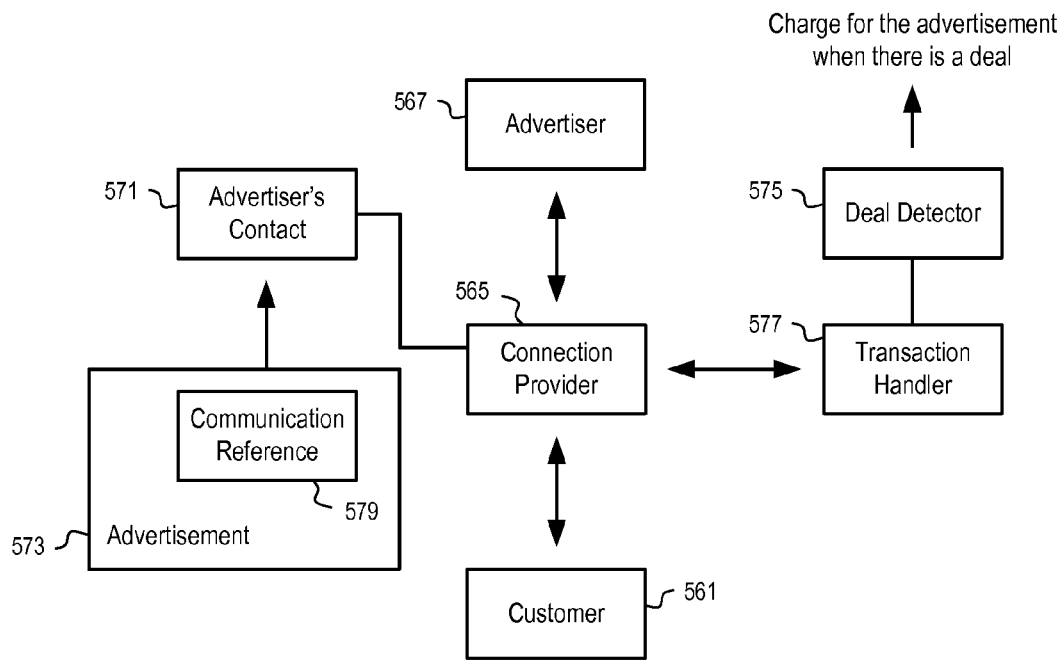
FIG. 17 shows a pay per deal advertisement process according to one embodiment.

FIG. 17 shows a pay per deal advertisement process according to one embodiment. In FIG. 17, a communication reference (579) is provided with the advertisement (573) to the customer (561). The customer (561) can response to the advertisement by using the communication reference (579) to request the connection provider (565) to provide a communication connection between the advertiser (567) and the customer (561). Based on the communication reference (579) used in the request, the connection provider (565) can determine the advertiser's contact (571) (e.g., through decoding/decrypting the communication reference or looking up the advertiser's contact using the communication reference as a key).

In FIG. 17, the connection provider (565) bridges the communications between the advertiser (567) and the customer (561). The connection provider (565) can monitor the communications to facilitate the transaction between the advertiser (567) and the customer (561). For example, the connection provider can provide the communications to a transaction handler (577) which performances the transaction on behalf of the customer (561) and/or the advertiser (567) based on the communications between the advertiser (567) and the customer (561).

For example, the advertisement (573) may present an offer from the advertiser to sell an item or service. Since the communication reference (579) can be used to request a voice connection to the advertiser (567) via the connection provider, the customer (561) can request a voice connection to talk to the advertiser (567) regarding the offer. After talking to the advertiser (567), the customer may decide to accept the offer. The customer can be instructed to provide a signal over the voice connection to indicate the acceptance of the offer. For example, the customer can press a key (e.g., "#") or dial a sequence (e.g., "*11") to indicate the acceptance, or provide a voice command (e.g., "accept" or "deal") after a voice prompt is provided by the transaction handler (577) via the connection provider (565) to the customer (561). The transaction handler (577) is configured to carry out the requests or deals made over the communication connection provided by the connection provider (565).

In FIG. 17, a deal detector (575) is coupled to the transaction handler (577) to detect a deal that is made via the communication connection provided by the connection provider (565) as a result of the advertisement (573). When there is a deal, the advertiser (567) is charged an advertisement fee for the advertisement (573).

In one embodiment, when there is no deal, the advertiser (567) is not charged an advertisement fee for the advertisement (573). For example, the connection provider (565) may charge the advertiser (567) for a communication service fee for the cost of the communication session between the customer (561) and the advertiser (567), regardless the result of the communication. The communication service fee may be based on the duration of the communication and/or the locations of the advertiser (567) and the customer (561). Alternatively, the communication service fee may be a monthly subscription fee, or a flat fee per communication session, or a flat fee per communication session having a duration less than a predetermined time limit (e.g., 3 minutes or 10 minutes). When there is a deal, the advertiser (567) is further charged an advertisement fee, according to a bid price of the advertiser or a flat fee price offered by the advertising network.

Alternatively, the communication service fee may be waived; and the advertising network may cover the communication cost using the advertisement revenue.

In one embodiment, the connection provider (565) includes a telecommunication service provider. The telecommunication service provider and the advertising network may share the advertisement income and/or the communication service fee.

For example, in one embodiment, the telecommunication service provider may charge the customer and/or the advertiser for a communication service fee for the connection made via the telecommunication service. The advertisement (573) can be presented to allow the customer (561) to particularly request the telecommunication service provide to provide the connection for the real time communications between the advertiser (567) and the customer (561). The advertising network and the telecommunication service provider can then share the revenue by compensating the advertisement network using a portion of the communication service fees resulted from the advertisements.

For example, when the advertisement is displayed on a mobile device of the customer (561) (e.g., a cellular phone), the advertisement can be presented in a format which allows the customer (561) to click on a link or icon to dial a number via the mobile device (e.g., the cellular phone) such that the phone call is made through a cellular communication network. For example, the advertisement can be presented in a format which allows the customer (561) to click on a link or icon to request the telecommunication service provider to call back the customer (561) for a connection to the advertiser (567). For example, the advertisement may present a telephone number dynamically assigned by the telecommunication service provider to the advertisement so that when the customer (561) call the dynamically assigned telephone number, the telecommunication service provider further connects the phone call to the advertiser (567).

Alternatively, the advertising network and the telecommunication service provider can share the revenue by compensating the telecommunication service provider using a portion of the advertisement fees resulted from the advertisements. For example, the telecommunication service provider may charge neither the customer nor the advertiser directly. Instead, the telecommunication service provider may charge the advertising network for the communication service; or the advertising network provides a percentage of the advertisement fee to the telecommunication service provider.

In one embodiment, the telecommunication service provider charges the customer and/or the advertiser for a communication service fee; and the advertising network charges the advertiser an advertisement fee. The advertising network compensates the telecommunication service provider by providing a portion of the advertisement fee to the telecommunication service provider; and the telecommunication service provider provides a portion of the communication service fee to the advertising network to compensate the advertising network for leading the customer to the services of the telecommunication service provider.

In one embodiment, the communication service fee is not charged; and the advertisement fee collected from the advertiser (567) is shared between the telecommunication service provider and the advertising network. In another embodiment, the advertisement fee is not charged; and the communication service fee collected from the customer (561) and/or the advertiser (567) is shared between the telecommunication service provider and the advertising network.

In one embodiment, the advertising network may instruct the telecommunication service provider to charge the advertisement fee. In one embodiment, the advertising network may instruct the telecommunication service provider to charge and/or credit the advertiser (567) and/or the customer (561) for the transaction made over the communication connection between the advertiser (567) and the customer (561). In one embodiment, the telecommunication service provider charges or credit the advertiser (567) and the customer (561) via credit card accounts (or other types of electronic payment methods). In one embodiment, the telecommunication service provider charges the advertisement fee via the telephone bill of the advertiser (567).

In FIG. 17, the transaction between the advertiser (567) and the customer (561) is facilitated via the transaction handler (577). For example, the transaction handler (577) may be configured to process payment from the customer (561) to the advertiser (567) for purchases made by the customer (561), to process payment from the advertiser (567) to the customer (561) for acquisition made by the advertiser (567), to process delivery of goods, information, etc. The customer (561) and/or the advertiser (567) can be instructed or guided to provide instructions to the transaction handler (577) over the communication connections provided via the connection provider (565).

For example, the transaction handler (577) may include an interactive voice response system, which may include business processing logic for conducting the transaction. When the advertiser and the customer reach an agreement, the advertiser and/or the customer may request the transaction handler to capture the agreement. For example, if the customer is ready to make the purchase, the advertiser (567) may request the transaction handle to take over the conversation with the customer (561), confirm the purchase price and payment information, and conclude the deal. For example, if the customer is ready to visit the advertiser (567), the advertiser (567) may request the transaction handler (577) to present a direction to the business location of the advertiser (567).

Alternatively or in combination, the advertiser (567) may be instructed to provide an indication of a deal to or via the connection provider whenever the advertiser (567) gets a deal from the communication connection provided by the connection provider (565).

In one embodiment, the advice, entertainment, information purchased or acquired in the deal is delivered via the communication channel provided by the connection provider. Alternatively, the purchased or acquired goods and/or services can be delivered without going through the connection provider (565) and/or the transaction handler (577).

In one embodiment, the advertisement (573) is delivered to the customer (561) before a communication connection between the connection provider (565) and the customer (561) is established; and the customer (561) requests the communication connection between the connection provider (565) and the customer (561) via the advertisement (573). For example, the customer (561) may perform a search on a mobile device using a web browser, a WAP application, or an SMS message (or an instant message); and the advertisement (573) is provided with the search result. For example, the customer (561) may enter or leave an geographic region (e.g., a commercial district or the vicinity of a business); and in response to a determination of the position of the customer (561) (e.g., via a GPS unit or a cellular position determination system) the mobile device carried with the customer can receive an advertisement (573) that is location sensitive.

In one embodiment, the advertisement (573) is delivered to the customer (561) over the communication connection between the connection provider (565) and the customer (561). For example, the connection provider (565) may also provide directory assistance service; and the advertisement (573) may be provided in response to a directory assistance request received from the customer (561) over the communication connection between the connection provider (565) and the customer (561). For example, the advertisement (573) may be provided in an audio format to the customer over the phone connection, or in a visual format to the customer's devices that is also capable to receive data, such as a cellular phone, a smart phone, a PDA, a portable computer, etc.

In one embodiment, the directory assistance provider is an entity separate from the connection provider; and the directory assistance provider forwards or bridges the connection to the connection provider for a connection to the advertiser (567) if the customer (561) responses to the advertisement (573).

Figure 18:
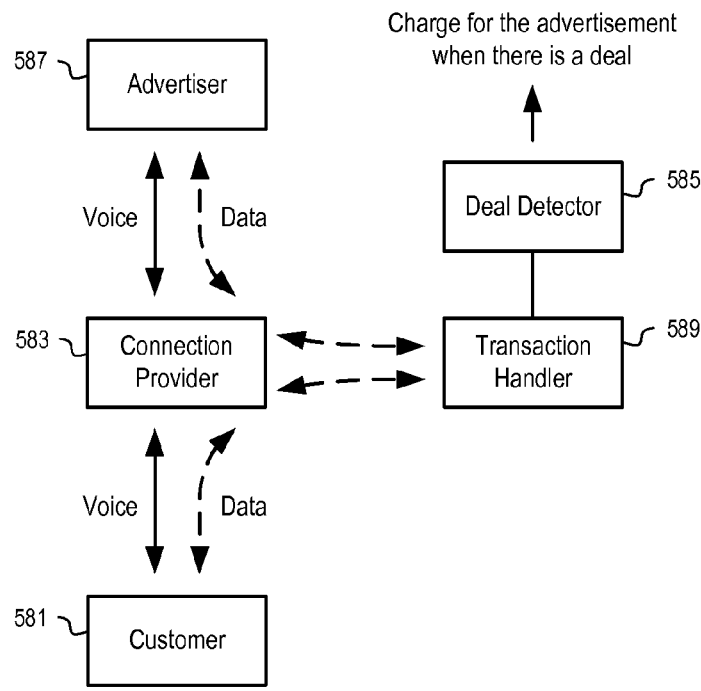
FIG. 18 shows a method to track a deal resulting from a real time communication connection provided in response to an advertisement according to one embodiment.

FIG. 18 shows a method to track a deal resulting from a real time communication connection provided in response to an advertisement according to one embodiment. In FIG. 18, the connection provider (583) provides both a voice connection between the advertiser (587) and the customer (581) and a data connection between the advertiser (587) and the customer (581). The voice connection allows a real time communication in person between the advertiser (587) and the customer (581); and the data communication connection is provided to facilitate the business transaction between the advertiser (587) and the customer (581).

In FIG. 18, the data connection goes through the transaction handler (589) which can monitor the data communications for the detection of a deal. An advertisement fee can be charged where a deal is detected.

For example, the transaction handler (589) may provide an application programming interface to facilitate the exchange of data between the transaction handler (589) and the advertiser (587). For example, when the customer (581) requests the voice connection to the advertiser (587), the transaction handler (589) can determine the advertisement to which the customer is responding and present information identifying the advertisement and/or information related to the customer (e.g., whether the customer is a repeated customer, statistics of prior purchases, prior calls, etc.). In one embodiment, the transaction handler (589) can further facilitates electronic commerce and presents the items to be sold via the advertisement to the advertiser to facilitate the voice communication with the customer. With the help of the voice communication connection with the customer (581), the advertiser can take the purchase order from the customer and conclude a deal.

In one embodiment, while the advertiser (587) is filling the purchase order, the transaction handler (589) can also present the relevant order data to the customer (581) via the data connection between the transaction handler (589) and the customer (581). When the deal is ready, the customer (581) can be asked to confirm the deal via the data connection (or via the voice connection). Further, during the process of filling the purchase order, the customer may also provide input via the data connection to directly modify or specify the purchase order.

For example, an application sharing session may be provided via the data connection to allow both the advertiser and the customer to walk through a common user interface to reach a deal.

In some embodiments, the data connection is provided between the advertiser (587) and the transaction handler (589) but not to the customer (581). In some embodiments, the data connection is provided between the customer (581) and the transaction handler (589) but not to the advertiser (587). In one embodiment, different types of data connections are provided to the advertiser (587) and to the customer (581); and the transaction handler (589) provides data information to the advertiser (587) and/or to the customer (581) based on pre-determined rules.

In one embodiment, the data connections are provided to facilitate the deal while voice communication connection between the advertiser (587) and the customer (581) is maintained. The data connection and the voice connection are maintained concurrently. Alternatively, the voice connection and the data connection may be provided in a way that is partially overlapping in time, or in a way that has no overlapping in time. For example, the data connection may be provided when the customer (581) and/or the advertiser (587) requests for the data connection. In one embodiment, when the data connection is provided, the customer (581) and/or the advertiser (587) is asked to identify the voice connection (e.g., based on time of the voice connection, a reference number provided in the voice communication channel, and/or an identification of the advertisement, etc.) Once the voice connection is identified, the context of the voice communication can be used to set up the data presentation in the data connection; and the deal detected by the deal detector (585) in the data connection can be attributed to the voice communication connection.

Alternatively, the data connection may be derived from the voice connection. For example, when the voice connection is provided via softphone or instant messaging session, the data connection can be added based on the voice connection. Alternatively, the voice connection may be derived from the data connection. For example, during the processing of conducting business transaction via the data connection, the customer may feel the need for a voice communication and thus requests the voice connection.

In one embodiment, when the customer (581) requests the data connection, the association relation between the voice connection and the data connection can be automatically identified based on the identity of the customer (581), the identity of the advertiser (587) and/or the identity of the advertisement.

In one embodiment, the data channel between the customer (581) and the connection provider (589) and/or the data channel between the advertiser (587) and the connection provider (589) may be the same or different ones of web/WAP, SMS, email, instant messaging, and a custom application/protocol.

For example, when the connection provider (583) detects that the communication device (e.g., a mobile phone, such as a cellular phone) has the data communication capability (e.g., web/WAP, SMS, instant messaging, etc.), the connection provider (583) can present a visual user interface to the customer (581) over the data connection to guide the customer (581) through the transaction and/or the confirmation of the deal between the customer (581) and the advertiser (587). For example, the connection provider (583) can send an SMS message to the cellular phone of the customer (581) to request a confirmation of the agreement made between the customer (581) and the advertiser (587); and the confirmation may be provided by the customer via a replying SMS message to the connection provider (583).

FIG. 19 shows another method to track a deal resulting from a real time communication connection provided in response to an advertisement according to one embodiment. In FIG. 19, the connection provider (593) provides a communication channel for real time communication communications between the advertiser (597) and the customer (591) via an advertisement. The customer (591) interacts with the transaction handler (599) separately to carry out a deal that is a result of the advertisement.

In FIG. 19, the connection provider (593) generates a connection record (592) which may include identification information of the customer (e.g., the IP address of the customer, the phone number of the customer, a user name of the customer, a credit card number of the customer, etc.), identification information of the advertiser (e.g., the advertisement for which the customer called, the phone number of the advertiser, an ID of the advertiser, etc.), the starting and ending time of the connection, etc. When the customer interacts with the transaction handler (599), the transaction handler (599) determines information about the transaction, such as identification information of the customer and identification information of the advertiser/advertisement. The information collected for the transaction can be matched against the connection record (592) by the deal detector (595) to determine whether the transaction is helped by any communication connections provided via the advertisement. In one embodiment, the matching process is further based on the time window of the transaction. For example, if there is overlap in time between the communication connection provided via the advertisement and the transaction, the communication connection may be credited for the deal. For example, if the transaction is performed before the expiration of a time window following the communication connection, the communication connection can be credited for the deal.

FIG. 19 illustrates an example in which the customer (591) interacts with the transaction handler (599) to close a deal. In other examples, the advertiser (597) may interact with the transaction handler (599) to close the deal. In further examples, both the advertiser (597) and the customer (591) may interact with the transaction handler (599) to close a deal.

FIG. 20 shows an example of a user interface (661) which allows an advertiser to define a deal for a pay per deal advertisement process according to one embodiment. In FIG. 20, the advertiser can define the "deal event". The occurrence of the deal event indicates that a deal, for the purpose of the advertisement, is closed; and the advertiser can be charged an advertisement fee for the deal achieved via the advertisement and/or the communication connection.

In FIG. 20, the advertiser may define the deal event as "the customer agrees to pay". For example, the system may provide payment processing for the advertiser. When the advertiser and the customer reaches an agreement over a phone connection, the advertiser can hand over the connection to the IVR system to process payment; and the IVR system may ask the customer for the payment information, such a credit card number, a bank account, a member ID, etc., and as the customer to confirm the acceptance of the charge. If the customer accepts the charge, the deal event "the customer agrees to pay" occurs; and the advertiser can be charged an advertisement fee for the deal delivered via the advertisement and/or the communication connection.

Alternatively, the advertiser may specify that the deal event occurs when the customer places an order, or the customer places a bid.

In one embodiment, the advertiser may specify that the deal event occurs when the customer visits a web page at an URL specified by the advertiser. The system may present a link (e.g., in the advertisement or in a web page presented to guide the customer through the connection process and/or the business transaction related to the advertisement) to direct the customer to the web page specified by the advertiser. Alternatively, the system may require the advertiser to place a code in the web page at the specified URL to allow the tracking of the visits to the URL. For example, the code may include a link to the server of the system, which when receives a request made via the link forwards the link to the original server of the web page. For example, in response to a user selection/interaction, the code may make a remote procedure call to a server of the system to report the user selection/interaction.

In one embodiment, the advertiser may specify that the deal event occurs when the customer presses the submit button in the web page at the URL. The system can request the advertiser replaces a submit button provided by the system to allow the tracking of the customer selection of the submit button. For example, the submit button provided by the system can visit the web server of the system to report the selection of the customer and then forward data submitted with the selection of the submit button to the advertiser. In one embodiment, the system can provide an application programming interface to forward the data to the advertiser. In another embodiment, the web server redirects the web request resulting from the selection of the submit button to an URL specified by the advertiser (e.g., the original target URL of submit button of the web page).

In one embodiment, in response to the advertiser specifying the deal event as the customer pressing the submit button in the web page, the system may visit the web page the URL specified by the advertiser, determine the target URL of the submit button of the web page, and provide a replacement submit button to replace the submit button in the web page the URL specified by the advertiser.

In one embodiment, the advertiser may specify that the deal event occurs when the customer agrees to provide an address to the advertiser. For example, the system can collect the address information from the customers; when the address of the customer is needed to close the deal, the system may prompt the customer to authorize the release of the customer's address information to the advertiser. When the customer agrees to release his/her address, the system detects a deal; in response to the deal, the system can charge the advertiser a fee for the advertisement.

In one embodiment, the advertiser may specify that the deal event occurs when the customer agrees to provide answers to certain question (e.g., an advertisement for a survey). For example, the system may conduct the survey on behalf of the advertiser, while allowing the advertiser to supervise, monitor, or assist the survey process via the communication connection between the customer and the advertiser. The system closes a deal when the customer provides answers to a set of questions specified by the advertiser.

In one embodiment, the advertiser can specify that the deal event occurs when the advertiser is satisfied and dial a sequence specified by the advertiser to indicate there is a deal.

In one embodiment, when the advertiser specifies the deal event, the system arranges the detection of the deal event such that the advertisement can be charged according to the deals detected according to the deal event defined by the advertiser. In one embodiment, the system is designed to have the capability to detect a variety of events; and the advertiser can select one types of events or a combination of events as the deal event.

In one embodiment, the options for the definition of deal events can be offered based on the types of advertisements, or the category of advertisements, and/or the services provided by the system to assist the business transaction. For example, an advertisement may involve an auction, an acquisition, selling physical goods or digital goods, etc. Different types/categories of advertisements may be offered different choices for defining what the advertiser deems as a deal.

FIG. 21 shows an example of a user interface (671) which allows an advertiser to specify an offer of an advertisement fee for a pay per deal advertisement process according to one embodiment. In FIG. 21, the advertiser can specify the advertisement fee as a percentage of what the customer pays for a purchase made by the customer, a lump sum for each deal, and/or a percentage of what the advertiser pays the customer for an acquisition made by the advertiser, etc.

In one embodiment, the advertiser can group deals for the payment of advertisement fees. For example, the advertiser may offer to pay a subscription fee of a pre-defined amount per month under the condition that the system delivers at least a pre-defined number of deals via the advertisement. In one embodiment, the advertiser may specify subscription fees for a number different levels of deal amounts realized via the advertisement; and the system charges the subscription based on the actual level of deal amounts. For example, the advertiser may specify a first subscription when the deals resulting from the advertisement is below a first number, a second subscription when the deals resulting from the advertisement is between the first number and a second number, etc. In one embodiment, the advertiser may offer a basic subscription to the advertising network and an additional amount for deals achieved in a given increment (e.g., each deal, or each ten deals or each dozen of deal, etc.).

In one embodiment, the advertiser may specify the price for the advertisement fee as a maximum bid price; and the system can automatically determine the actual bid price based on the bid prices of the competitors of the advertiser.

In one embodiment, the advertiser may specify the price for the advertisement fee as a function of a bid price of the customer for the information, service, digital or physical products, or ownership interest offered by the advertiser. For example, the advertiser can offer information, service, digital or physical goods for sell via an auction; and the advertisement may be used to provide communication connections for communications between the advertiser and customers. When the auction is closed, the advertisement fee may be determined based on the largest bid price of the customers who have placed bids via the advertisement (or via the communication connections provided through the advertisement). Alternatively, the advertisement fee can be determined based on the winning bid independent of whether the winning bid is placed via a communication connection provided through the advertisement. Alternatively or in combination, the advertisement fee may also be charged for each distinct bid (or the highest bid from each distinct customer) received via the communication connection provided through the advertisement. In one embodiment, the advertisement fee can also be a function of the number of bids received over the communication connections provided via the advertisement, the level of the bid prices, and/or the quantities purchased by the customer. The function may be a continuous function, or a discontinuous function on a sliding scale. For example, an advertisement fee may be specified as $1.00 if the winning bid is above $10 but less then $20 and $2.00 if the winning bid is above $20. For example, an advertisement may be used to advertise the auction of a stock; and the advertisement fee can be different depending upon the amount of the bid for each share, the number of shares involved in the transaction, etc. In one embodiment, other conditions for the transaction can also be included in the computation of the advertisement fee, such as whether the purchase is in blocks, or odd lots, etc.

In one embodiment, the chargeable event for a performance based advertisement is not a single type of predetermined events. The chargeable event for an advertisement presented to a customer is dynamically determined/selected from a set of different predetermined events based on the actual progress achieved.

For example, an advertisement can be presented with a click to call button, a click to reveal button, and/or a link to a web page of the advertiser or a web page presenting the advertiser (or a product of the advertiser). When the advertisement is selected (e.g., clicked) but not called through to the advertiser, the advertisement can be treated as a pay per click advertisement; when the advertisement is called through, the advertisement can be treated as a pay per call advertisement; and the clicks leading to the call are not separately charged for. When a deal is reached, the advertisement is treated as a pay per deal advertisement; and the clicks and calls leading to the deal are not separately charged for. Alternatively, the clicks, the calls and/or the deals can be treated as separate events qualified for separate charges.

In one embodiment, the presentation of an advertisement initiates a customer acquisition process for the advertiser. The advertisement can have one or more predefined goals in the customer acquisition process, such as selling a package of service or product, obtaining a bid on an auction item, obtaining answers to questions, selling information, entertainment, amusement, etc. Multiple anticipated events between the presentation of an advertisement and the goal(s) of the advertisement are tracked as the progress indicators of the customer acquisition process. The advertisement can be charged for according to the actual progress level achieved based on the tracked events. The closer the progress to the goal(s) of the advertisement, the more the advertisement can be charged for.

In one embodiment, the progress is tracked for a particular customer and/or for a particular time period. For example, an advertisement may be presented to a customer multiple times within a time period (e.g., an hour, a day or a week). The customer acquisition process targeting this particular customer may reach some progress levels multiple times within the particular time period. The highest progress level achieved within the particular time period can be identified for the process targeting this particular customer; and the advertisement can be charged for based on the highest progress level achieved. Thus, the advertiser is not charged multiple times for lower progress levels achieved within the particular time period in the customer acquisition process targeting this particular customer; and the advertiser is not charged multiple times for the highest progress level achieved within the particular time period in the customer acquisition process targeting this particular customer.

In one embodiment, the highest achieved progress level is not charged for multiple times within a particular time period, if the highest progress level achieved in relation with the particular customer is not the highest possible progress level. For example, when the highest possible progress level is a purchase deal, multiple calls from a customer to the advertiser resulting are counted as one, if the calls received within a time window (e.g., an hour, a day or a week) do not result in a purchase deal; when there are multiple purchase deals resulting from multiple calls within the time window, the advertiser can be charged multiple times for the purchase deals. Alternatively, the multiple purchase deals with the customer within the time window may also be counted as one chargeable event.

In one embodiment, a set of configurable rules are used to determine chargeable events that can be waived in view of other chargeable events. Some chargeable events can be waived in view of prior chargeable events; and some chargeable events can be waived in view of subsequent chargeable events.

In one embodiment, the advertisement fee corresponding to the highest progress level achieved in the customer acquisition process targeting this particular customer is charged incrementally as the customer acquisition process reaches various levels within the particular time period. Alternatively, the highest achieved progress level is determined after the expiration of the time period (or when the highest possible level is achieved); and then the advertisement fee is charged according to the price associated with the determined progress level.

FIG. 22 shows an example of dynamically determine the chargeable event for an advertisement based on the progress achieved via the advertisement according to one embodiment. In FIG. 22, the desired goal of the advertisement (701) is to achieve a transaction (709) between the advertiser and a customer. The desired transaction may include the advertiser purchasing a product or service from the customer or the customer purchasing a product or service from the advertiser. In some transactions, the customer or the advertiser obtains desired information over the real time communication channel provided via the advertisement. A transaction deal between the customer and the advertiser may or may not involve a monetary transaction.

In FIG. 22, the presentation of the advertisement (701) is arranged to lead to different levels of communications (e.g., 703, 705, . . . ) and to the transaction (709). When the customer requests for the first level communication (703), such as a web page of the advertiser or a web page of a connection provider presented on behalf of the advertiser, the advertisement achieves a progress level for which the advertisement can be charged for according to price A. When the customer further requests for the second level communication (705), such as a phone call with the advertiser, the advertisement achieves a progress level for which the advertisement can be charged for according to price B, which is typically higher then price A. When the customer requests for the transaction (709), the advertisement achieves a progress level for which the advertisement can be charged for according to price X, which is typically higher then price B.

In one embodiment, the different levels of communications (e.g., 703, 705, . . . ) leading toward the transaction (709) are arranged to occur sequentially according to a single predetermined path. For example, the advertisement (701) can be presented in a telephonic apparatus that is configured to allow the user to select a link embedded in the advertisement (701) to visit a web page presented on behalf of the advertiser. The web page contains a link which when selected causes the telephonic apparatus to initiate a call to the advertiser (or to send a message to a connection provider to request for a callback to the telephonic apparatus for a connection to the advertiser). During the phone conversation the telephonic apparatus presents a user interface to allow the user to accept a payment request from the advertiser for a purchase.

Alternatively, there may be multiple paths from the presentation of the advertisement (701) to the transaction (709). For example, the first level communication (703) (e.g., a web page) may also include a user interface to allow the user to make the purchase without going through the second level communication (705) (e.g., a phone call). For example, after the phone conversation, the user may revisit the web page and make a purchase request via the web page directly. In another example, after viewing the web page, the user may revisit the advertisement and make a phone call directly based on a telephonic reference provided in the advertisement without again requesting the web page.

In one embodiment, the hierarchy of chargeable events used as process indicators is defined according to the desirability of the events in reaching the goals of the advertisers. Alternatively, the hierarchy of chargeable events can be determined based on the prices associated with the chargeable events. In some embodiments, the hierarchy of chargeable events can be structured based on the designed or anticipated flow sequence of events.

In one embodiment, some of the communications can be initiated concurrently. For example, the selection of the advertisement may cause the telephonic apparatus of the user to display the web page and initiate a call to the advertiser. Alternatively, the web page can be displayed with a user interface to request a callback to the user.

In one embodiment, the user terminals used by the customers and/or the advertisers are configured to track the progress. In another embodiment, the progress is tracked via dynamically assigning communication references which can be used on general purpose user terminals to request the communication connections and via monitoring the communications over the connections.

For example, after the advertisement (701) is requested by the user, the advertisement (701) is provided to the user with an embedded link to a web page. The link includes a parameter identifying the user, such as an IP address of the user, a phone number of the user, and/or a user identifier, etc. The telephonic reference presented in the web page and/or the advertisement can be associated with or constructed to include the same parameter identifying the user. Thus, the phone call initiated with the telephonic reference can be associated with the selection of the link via the parameter identifying the user. When the transaction is at least partially via the communication over the telephonic connection, the transaction can be associated with the user. When the transaction is via the web page, the link to submit the transaction request can also include the parameter to identify the user.

In one example, an advertisement can be presented with a user interface to request different levels of communications. For example, the advertisement can be selected by a customer to request further information, such as a web page, an electronic brochure, a text document, a multimedia document, etc. The information provided via the advertisement can be presented with a further user interface element selectable to request text-based real time communication, such as text chat or instant messaging. A text chat or instant messaging session can further lead to a voice and/or video chat, or a telephonic conversation. For example, a telephonic reference can be provided via the text chat or instant messaging session. Alternatively, the text chat or instant messaging session can be upgraded to a voice communication session. Real time communications can lead to a desired transaction between the customer and the advertiser.

In one embodiment, the performance process of the advertisement can be identified through monitoring the occurrences of events such as the selection of the advertisement by the customer to request further information, the connection for the text-based real time communication, the connection for voice-based real time communication, and the desired transaction.

In one embodiments, the events may occur when the customer is using different user terminals. For example, a selection of an advertisement may occur when the customer is viewing the advertisement on a web browser running on a computer; and the customer may use a telephone set separate from the computer for a telephone conversation with the advertiser. The events can be associated with the customer via assigning the links and the telephonic references that are specific to the customer.

Figures 23, 24:
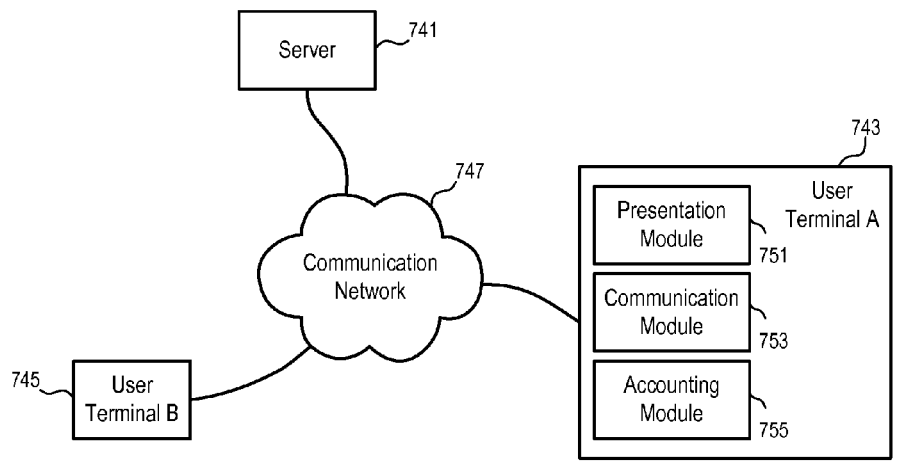
FIG. 23 shows a user interface to specify a price bid for an advertisement according to one embodiment.
FIG. 24 shows user terminals configured to provide and monitor real time communications according to one embodiment.

FIG. 23 shows a user interface to specify a price bid for an advertisement according to one embodiment. In FIG. 23, the advertiser can specify the prices for various milestones in the customer acquisition process initiated via the presentation of the advertisement. In one embodiment, the system charges for the advertisement according to the highest price among those specified for the achieved milestones; thus, the advertiser is encouraged to specify a higher price for a milestone that is closer to the goal of the advertisement and a lower price for a milestone that is further from the goal of the advertisement.

Alternatively, the hierarchy of the milestones is predetermined; and the advertiser is not allowed to specify a lower price for a higher level milestone. For example, a per call price cannot be lower than a per click price; and a per deal price cannot be lower than a per call price. In one embodiment, the advertiser can choose to use some of the milestone but not the other milestones. For example, the advertiser may offer a per click price and a per deal price without a per call price, or offer a per click price and a per call price without a per deal price, or offer a per call price and a per deal price without a per click price.

In one embodiment, the advertiser can further select the link (721) to specify conditions for the qualified click. For example, the advertiser may require that a qualified click include a selection of a link to an advertiser's web site, a selection of a link to a detailed description of the offer of the advertiser, a selection of a link to sign into a user account, and/or a selection of a link to provide payment information, etc. The advertiser may require that the qualified click be from a user who has not been a customer of the advertiser for at least a period of time. In one embodiment, the advertiser can also specify the time window within which multiple clicks are counted as one. Alternatively, some of the parameters can be specified by the system.

In one embodiment, the advertiser can further select the link (723) to specify conditions for the qualified call. For example, the advertise may require that a qualified call include a call for text chat, a call for instant messaging session, and/or a telephone call, etc. The advertiser may require that the qualified call be from a user who has not been a customer of the advertiser for at least a period of time. In one embodiment, the advertiser can also specify the time window within which multiple calls are counted as one. Alternatively, some of the parameters can be specified by the system.

In one embodiment, the advertiser can further select the link (725) to define a deal event. For example, an interface (661) shown in FIG. 20 can be presented to define a deal by the advertiser in response to the selection of the link (725).

FIG. 24 shows user terminals configured to provide and monitor real time communications according to one embodiment. In FIG. 24, the user terminal (743), such as a telephonic apparatus, includes a presentation module (751), a communication module (753) and an accounting module (755). However, a user terminal with more modules can be used; and a user terminal with fewer modules can also be used in at least some embodiments described below.

In one embodiment, the presentation module (751) is configured to present to a user a listing retrieved from the server (741) or from a peer to peer network over the communication network (747). In one embodiment, the listing includes a communication reference which can be selected on the user terminal (743) to request a connection to a user terminal (e.g., 745) for communications with the entity of the listing (e.g., advertiser, seller, advisor, etc.) and/or to request other information related to the entity.

In one embodiment, the communication module (753) can make a peer to peer connection to the user terminal (745) via the communication reference provided in the listing. For example, the communication reference provided in the listing may include an encrypted reference to connect to the user terminal B (745), such as the user identifier of the callee, a telephone number of the callee, a session initiation protocol universal resource identifier of the callee, etc. The communication module (753) is configured to decrypt the reference and make a connection to the user terminal via a peer to peer network. For example, the communication module may query the peer to peer network or the server (741) to determine the presence of the callee on the user terminal (745) according to the decrypted user ID of the callee and then initiate a connection with the user terminal (745).

In one embodiment, the communication module (753) initiates the connection in accordance with the callable schedule of the callee. For example, the communication module (753) can be configured to query whether the current time instance is within the callable schedule of the callee; and the connection is not initiated if the current time instance is outside the callable time period of the callee. In one embodiment, the peer to peer network or the server (741) is configured to provide the presence information of the callee being on the user terminal when the current time instance is within the callable schedule of the callee. When the current time instance is outside the callable schedule, the user terminal (743) is not provided with the presence information that can be used to call for the connection, even when the callee is online on the user terminal (745).

In one embodiment, the accounting module (755) is used to maintain the account information. For example, when the user activates the user terminal (743) or when the user signs into the member account of the user, the account information can be initialized or loaded into the accounting module (755).

In one embodiment, the accounting modules (755) of the user telephonic apparatus (755) can perform transactions or record the transactions for subsequent updating in a centralized account database. In another embodiment, the account information of the members is maintained on a peer to peer network, with or without the help of a centralized account server.

For example, in one embodiment, the user terminal (743) used by the customer maintains the member account of the customer via the accounting module (755); and the user terminal (745) used by the seller or advertiser maintains the member account of the seller or advertiser via a corresponding accounting module. The user terminal (743) of the customer pays the user terminal (745) of the seller via the peer to peer communication connection between the user terminal of the customer and the user terminal of the seller. The user terminal of the advertiser (745) can be instructed to deduct an advertisement fee from the account maintained on the user terminal of the advertiser in response to a chargeable event reported from the user terminal (745) of the customer.

In one embodiment, during or after the communications between the customer and the seller, the user terminal of the customer and/or the user terminal can make a connection to a server of a service provider to provide a commission fee for the transaction to the service provider. In another embodiment, the commission fee is provided to the service provider via deduction of a portion of the balance maintained by the accounting modules.

In one embodiment, a member account indicates the balances the member has through pre-paying the connection provider/service provider. The balance may be in the unit of minutes for telecommunications (e.g., telephonic communication, instant messaging communications, etc.), in the unit of a currency (e.g., U.S. Dollar), or in the unit of points, etc. In one embodiment, the processing of the payment charged by the seller is in the form of transferring the member balance from one member account to another member account (e.g., via a peer to peer network or a centralized server). In one embodiment, a member account is maintained on a user terminal such as a computer, a PDA, or a telephonic apparatus (e.g., a softphone or a cellular phone, a WiFi phone, or a PDA based phone). In one embodiment, the member account can be dynamically transferred from being hosted on one user terminal to another terminal, via a peer to peer network or a centralized server.

In another embodiment, the member account is maintained on a centralized server.

In one embodiment, the processing of collecting commission fee is in the form of deducting a portion of the balance from a member account, or transferring from a member account to an account of the service provider. In one embodiment, records of the transactions are stored by the accounting modules to bill or credit the members via their telecommunication bills (e.g., telephone bills, cellular phone bills, etc.)

For example, the accounting module (755) of the user terminal (743) of the customer is configured to monitor the progress of the customer acquisition process on the user terminal (743) and to report the dynamically identified chargeable event to the user terminal (745) of the advertiser, which is configured to deduct the advertisement fee based on the dynamically identified chargeable event reported by the user terminal (743). Alternatively, the accounting module (755) of the user terminal (743) is configured to report various detected events to the accounting module of the user terminal (745), which is configured to determine the actual chargeable event for the advertisement. Alternatively, an accounting module implemented on the server (741) can be used to determine the actual chargeable event for the advertisement based on the events reported from the user terminal (743) and/or the user terminal (745).

In one embodiment, a user terminal (e.g., 743) is configured to communicate with a financial institution to facility the transaction. For example, one user terminal may be configured to access a bank account of the member to make or receive payments; and another user terminal may be configured to make or receive payments via a credit card account, a debit card account, etc. The user terminals connected via a peer to peer connection may not use the same financial institution. In one embodiment, the user terminals are configured to use their respective associated financial accounts to automatically process the payment, after both the seller and the customer agree on the payment request.

In one embodiment, a connection server charges or pays the customers and/or advertisers, advisors, sellers, service providers, etc. via bank accounts, credit card accounts, debit card accounts, member accounts, etc., after authenticating the identities of the customers and/or the advertisers, advisors, sellers, service providers, etc. for providing the connections for real time communications.

In one embodiment, when the user signs off from the user terminal (743), the account information is transferred to the server (741) which allows the user to sign in from a different user terminal to access the service. In one embodiment, a user can explicitly request the user terminal to transfer the balance to the server or to another user terminal.

In one embodiment, the accounting module (755) periodically reports the account information to the server (741). In one embodiment, account information is reported with details about various potentially chargeable events, such as the calls for connections (e.g., call detail records), selection of links, activation of icon buttons, etc.

In one embodiment, when a user requests for a listing, the peer to peer network or the server (741) can determine whether the user terminal used by the user is capable of making a peer to peer connection and tracking the account information. When the user terminal has the capability, the user terminal is provided with the listing embedded with a version of the communication reference of the callee; and the listing is selectable to initiate the peer to peer connection without going through the server (741). When the user terminal does not have the capability, the user terminal is provided with the listing embedded with a communication reference of the server (741) to allow the user terminal to request the server (741) to provide a connection with the callee. When the user terminal (743) does not have the communication module to make the real time communication connection, the user terminal (743) can be presented with a reference of the server (741) for a call for connection via a separate user terminal, or a reference to request a callback from the server (741).

In one embodiment, when the communication module (753) fails to make a peer to peer connection with the user terminal of the callee (e.g., when the peer to peer network determines that the callee is not currently on line), the communication module (753) is configured to request the server (741) to provide a connection with the callee. For example, when the softphone of the customer failed to connected to the softphone of the advisor, the softphone of the customer can call the server (741) which determines a landline phone of the advisor and connect the customer to the advisor on the landline phone.

Thus, depending on the capabilities of the user terminals of the user and the callee, the server (741) may dynamically get involved in the connection process and/or in the process of tracking the events/milestones, and/or account balances. The user and the callee of the listing can use a variety of user terminals to access and deliver the services, such as user terminals that are implemented with only a subset of functionalities of the modules of user terminal (743), or conventional user terminals.

In one embodiment, when a user terminal of the caller (or the callee) partially or entirely lacks the functionalities to make the peer to peer connection and/or track the account information and milestones, the communication references presented in the listings are dynamically adjusted according to the capability of the user terminal to bring the server (741) (or a peer to peer network) into the communication path to add the functionality as a system. For example, a server (741) may act as a portion of the communication module of the user terminal and/or as a portion of the accounting module of the user terminal. For example, the link may have an address pointing to the server (741) which, when receives the request, forwards the request to a destination address. For example, the user terminal of the caller can communicate with the server (741) to establish a connection with the user terminal of the callee; and the server (741) can initiate a session for the connection with the user terminal of the callee and provide a virtual accounting module for the user terminal (743) in the session, after authenticating the caller. For example, a caller can use a plain old telephone set (POTS) to call the server (741), which connects the caller to an IVR system (or a human operator) to authenticate the caller, track the usage of the caller, and make a peer to peer connection to the user terminal of the callee (or call the callee on a PSTN network).

In one embodiment, at the time the listing is being requested for presentation to the user, the server (741) or the peer to peer network can provide the communication reference based on a determination of whether the user terminal of the user and the user terminal of the callee can make a peer to peer connection and track the communications and milestones.

For example, if both the user terminal of the user and the user terminal of the callee have the peer to peer communication module and the accounting module, the user terminal can be provided with the communication reference of the callee for a peer to peer connection without going through a centralized server. The accounting module of the user can deduct an amount of balance from the account of the user maintained on the user terminal of the user; and the accounting module of the callee can add an amount of balance to the account of the callee maintained on the user terminal of the callee.

For example, if both the user terminal of the user and the user terminal of the callee have the communication module to make a peer to peer connection but one of the user terminals lacks the accounting module, the communication reference can be assigned to cause the accounting module to report the activity to the server (741). Thus, the system can operate in a way as if the missing account module were on the server (741).

For example, when the user terminal of the user has an accounting module (755) and the user terminal of the callee does not have an accounting module, the accounting module (755) can cause the communication module (753) to report the communication session to the server which credits to the account of the callee based on the communication duration over the peer to peer connection between the callee and the user as reported by the user terminal (743) of the user.

For example, when the user terminal of the user does not have an accounting module and the user terminal of the callee has an accounting module, the user terminal of the callee can communicate with the server (741) to identify the user, to monitor the communications and track the progress, and/or to reduce the balance of the account of the user for purchases.

For example, when neither the user terminal of the user nor the user terminal of the callee has an accounting module, the user terminal of the callee can be provided with a VoIP communication reference which, when used to set up a call, causes the call signaling messages to go through the server (741) to allow the server to identify the caller, to provide the connection based on the callable schedule of the callee, and/or to track the communications and service the accounts of the user and the callee. For example, the communication reference can be provided with an embedded identifier of the caller after the caller is authenticated. Alternative or in combination, the caller can be authenticated after the caller initiates the call.

Figure 25:
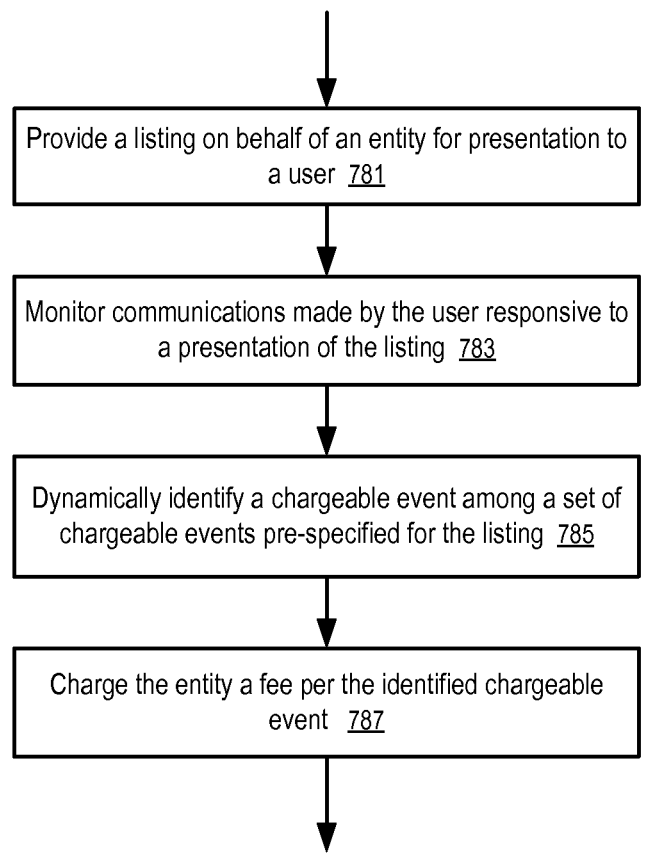
FIG. 25 shows a method to provide an advertisement which is charged for based on dynamic performance criteria according to one embodiment.

FIG. 25 shows a method to provide an advertisement which is charged for based on dynamic performance criteria according to one embodiment. In FIG. 25, after a listing is provided (781) on behalf of an entity for presentation to a user, communications made by the user responsive to a presentation of the listing are monitored (783) to identify (785) an event from a set of predetermined events, such as the user selecting the listing to receive data (e.g., selecting a link or an icon button to request a web page), the user establishing a connection for real time communications with the entity, the user making a deal with the entity, etc. The entity is charged (787) a fee per the event identified/selected from the set of predetermined events.

In one embodiment, the connection for real time communications with the entity is to be established via the data presented after the user selecting the listing; and the deal is to be made via the real time communications over the connection between the user and the entity.

In one embodiment, to establish the connection for real time communications with the entity the user may place a call to a connection provider for a connection for real time communications with the entity, or receive a callback from a connection provider for a connection for real time communications with the entity, or establish a peer to peer connection for real time communications with the entity without going through a centralized connection provider. For example, the connection can be established for telephonic conversation, for chat in text, voice or video, for screen sharing, for application sharing, or for virtual reality experience with the entity.

In one embodiment, the predetermined events are to occur sequentially one after another; and a latest event that is responsive to the presentation of the listing is determined as the identified event for charging the fee. In one embodiment, the fee is charged according to a set of prices received from the entity for the set of predetermined events respectively.

In one embodiment, the entity is incrementally charged according to the set of prices in response to a plurality of events up to the latest event. For example, in response to one of the events, the system determines whether the current event has a price higher than a previously charged event. If the current event has a price higher than the previously charged event, the charge for the previous event is waived; and the advertisement is charged for according to the price of the current event. If the current event has a price lower than the previously charged event, the charge for the current event can be waived. In one embodiment, the event is dynamically identified after the presentation of the listing.

In one embodiment, a set of prices are associated with the set of predetermined events respectively; and a highest priced event that occurred in response to a presentation of the listing to the user is selected from the set of predetermined events as the identified chargeable event.

In one embodiment, a charge to the entity is waived when a gap between the identified event and a prior charged event is within a predetermined period, where the prior charged event may be responsive to a prior presentation of the listing to the user.

In one embodiment, the listing includes a reference selectable to request a callback for a real time communication connection with the entity; and the set of predetermined events includes selecting the reference to request the callback, accepting the callback, and accepting a payment request from the entity over the real time communication connection. In one embodiment, the communication system charges the user on behalf of the entity responsive to the user accepting the payment request.

In one embodiment, the listing further includes a telephonic reference, such as a telephone number without an extension, a telephone number with an extension, a session initiation protocol (SIP) uniform resource identifier (URI), a user identifier of an instant messaging network, or a voice over Internet Protocol (VoIP) user identifier; and the set of predetermined events further includes initiating a telephone call using the telephonic reference.

In one embodiment, the listing further includes a link to a web site of the entity; and the set of predetermined events further includes selecting the link.

In one embodiment, the listing is presented on a telephonic apparatus of the user; and the set of predetermined events includes selecting a link embedded in the listing to request a document for presentation on the telephonic apparatus of the user, and requesting a peer to peer connection to a telephonic apparatus of the user via the listing. In one embodiment, the telephonic apparatus of the user is further configured to transfer an amount to the telephonic apparatus of the entity in response to the user accepting a payment request made via the telephonic apparatus of the entity.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A method, comprising:
   providing, using a computing device, a listing on behalf of an entity for presentation to a user;
   identifying, using the computing device, a plurality of events for which the entity is to be charged from a set of predetermined events based on communications made by the user responsive to a presentation of the listing, wherein an event in the set of predetermined events includes the user selecting the listing to receive data by selecting a link or an icon button to request a web page, wherein the plurality of events include a first event and a second event that are dynamically identified after the presentation of the listing, and wherein the second event is subsequent to the first event;
   receiving, from the entity, a set of prices, wherein each price in the set of prices corresponds to a respective event in the set of predetermined events;
   in response to identifying the first event, charging the entity a first fee corresponding to a first price in the set of prices; and
   in response to identifying the second event:
      determining that the second event corresponds to a second price in the set of prices that is higher than the first price;
      waiving the first fee; and
      charging the entity a second fee corresponding to the second price.

2. The method of claim 1, wherein the set of predetermined events includes the user establishing a connection for real time telephonic communications with the entity by: the user placing a call to a connection provider for a connection for real time telephonic communications with the entity, the user receiving a callback from a connection provider for a connection for real time telephonic communications with the entity, or the user establishing a connection for real time telephonic communications with the entity.

3. The method of claim 2, wherein the connection for real time telephonic communications comprises a connection for chat in text, voice or video.

4. The method of claim 1, further comprising:
   waiving a charge to the entity responsive to a gap between the identified event and a prior charged event being within a predetermined period, the prior charged event being responsive to a prior presentation of the listing to the user.

5. The method of claim 1, wherein the listing comprises a reference selectable to request a callback for a real time communication connection with the entity; and the set of predetermined events comprises selecting the reference to request the callback, accepting the callback, and accepting a payment request from the entity over the real time communication connection.

6. The method of claim 5, wherein the listing further comprises a telephonic reference including a telephone number without an extension, a telephone number with an extension, a session initiation protocol (SIP) uniform resource identifier (URI), a user identifier of an instant messaging network, or a voice over Internet Protocol (VoIP) user identifier; and the set of predetermined events further comprises initiating a telephone call using the telephonic reference.

7. The method of claim 5, further comprising:
charging the user on behalf of the entity responsive to the user accepting the payment request.

8. The method of claim 1, wherein the listing is presented on a telephonic apparatus of the user; and the set of predetermined events comprises selecting a link embedded in the listing to request a document for presentation on the telephonic apparatus of the user, and requesting a peer to peer connection to a telephonic apparatus of the user via the listing.

9. The method of claim 8, wherein the telephonic apparatus of the user is configured to transfer an amount to the telephonic apparatus of the entity in response to the user accepting a payment request made via the telephonic apparatus of the entity, wherein the telephonic apparatus of the entity is configured to maintain account information for the entity.

10. The method of claim 1, wherein at least a portion of the listing is editable by the user.

11. The method of claim 1, wherein the second fee is a subscription fee for a number of bundled leads.

12. The method of claim 8, wherein the telephonic apparatus of the user is a softphone designed to make direct connections over a peer to peer network and the softphone is configured to deduct fees and transfer funds via accounts maintained by the softphone.

13. The method of claim 1, wherein the predetermined set of events includes the user making a deal with the entity.

14. A tangible, non-transitory computer-readable medium storing instructions that, when executed by a computing device, cause the computing device to:
provide a listing on behalf of an entity for presentation to a user;
identify a plurality of events for which the entity is to be charged from a set of predetermined events based on communications made by the user responsive to a presentation of the listing, wherein an event in the set of predetermined events includes the user selecting the listing to receive data by selecting a link or an icon button to request a web page, wherein the plurality of events include a first event and a second event that are dynamically identified after the presentation of the listing, and wherein the second event is subsequent to the first event;
receive, from the entity, a set of prices, wherein each price in the set of prices corresponds to a respective event in the set of predetermined events;
in response to identifying the first event, charge the entity a first fee corresponding to a first price in the set of prices; and
in response to identifying the second event:
determine that the second event corresponds to a second price in the set of prices that is higher than the first price;
waive the first fee; and
charge the entity a second fee corresponding to the second price.

15. An apparatus, comprising:
a processor; and
memory coupled to the processor and storing instructions that, when executed by the processor, cause the apparatus to:
provide a listing on behalf of an entity for presentation to a user;
identify a plurality of events for which the entity is to be charged from a set of predetermined events based on communications made by the user responsive to a presentation of the listing, wherein an event in the set of predetermined events includes the user selecting the listing to receive data by selecting a link or an icon button to request a web page, wherein the plurality of events include a first event and a second event that are dynamically identified after the presentation of the listing, and wherein the second event is subsequent to the first event;
receive, from the entity, a set of prices, wherein each price in the set of prices corresponds to a respective event in the set of predetermined events;
in response to identifying the first event, charge the entity a first fee corresponding to a first price in the set of prices; and
in response to identifying the second event:
determine that the second event corresponds to a second price in the set of prices that is higher than the first price;
waive the first fee; and
charge the entity a second fee corresponding to the second price.

* * * * *